(12) United States Patent
Fox et al.

(10) Patent No.: US 9,720,078 B2
(45) Date of Patent: Aug. 1, 2017

(54) SYSTEM AND METHOD FOR WIDE-AREA STRATOSPHERIC SURVEILLANCE

(71) Applicant: Raven Industries, Inc., Sioux Falls, SD (US)

(72) Inventors: Phillip A. Fox, Hertford, NC (US); Michael Scott Smith, Sulphur Springs, TX (US); George W. Moe, Columbia, MD (US); Joseph W. Maresca, Jr., Sunnyvale, CA (US)

(73) Assignee: Raven Industries, Inc., Sioux Falls, SD (US)

( * ) Notice: Subject to any disclaimer, the term of this patent is extended or adjusted under 35 U.S.C. 154(b) by 753 days.

(21) Appl. No.: 13/835,574

(22) Filed: Mar. 15, 2013

(65) Prior Publication Data

US 2014/0191893 A1 Jul. 10, 2014

Related U.S. Application Data

(60) Provisional application No. 61/638,457, filed on Apr. 25, 2012.

(51) Int. Cl.
*G01S 13/95* (2006.01)
*G01S 13/02* (2006.01)
(Continued)

(52) U.S. Cl.
CPC .......... *G01S 13/0218* (2013.01); *G01S 13/89* (2013.01); *G01S 13/867* (2013.01)

(58) Field of Classification Search
CPC ....... B64C 2201/022; B64B 1/40; B64B 1/44; G01S 13/0218; G01S 13/89
(Continued)

(56) References Cited

U.S. PATENT DOCUMENTS 7,341,224 B1 * 3/2008 Osann, Jr. ............. B64C 39/028
 244/30
8,116,763 B1 * 2/2012 Olsen .................... H04W 16/28
 455/422.1
(Continued)

FOREIGN PATENT DOCUMENTS

HR WO 2012025769 A1 * 3/2012 ............... B64B 1/06
WO WO 2012025769 A1 * 3/2012

*Primary Examiner* — Jack W Keith
*Assistant Examiner* — Marcus Windrich
(74) *Attorney, Agent, or Firm* — Schwegman Lundberg & Woessner, P.A.

(57) ABSTRACT

Methods and apparatuses for providing wide-area surveillance with a radar and/or other sensors from a stratospheric balloon launched from a land or ship platform for detection, tracking, and classification of maritime, land, and air objects such as ships, people/vehicles, or aircraft are described generally herein. In one or more embodiments, an apparatus is battery operated and includes a stratospheric balloon filled that is filled with helium when it is launched and a gondola with a radar system and communication equipment suspended therefrom. When launched, the apparatus can travel with the wind until it reaches an altitude of approximately 68,500 ft., then it can move substantially horizontally with the stratospheric winds until it returns to earth via a parachute. Multiple apparatus launches at periodic intervals can help provide continuous coverage of the surveillance area. The apparatus can be recovered and re-used or can be considered expendable.

15 Claims, 15 Drawing Sheets

(51) Int. Cl.
*G01S 13/89* (2006.01)
*G01S 13/86* (2006.01)

(58) Field of Classification Search
USPC ........ 244/31; 342/26 A, 26 R, 26 B, 27, 352
See application file for complete search history.

(56) References Cited

U.S. PATENT DOCUMENTS

| | | | | |
|---|---|---|---|---|
| 8,226,043 | B2* | 7/2012 | Reinhard | B64D 17/025 244/138 R |
| 8,634,974 | B2* | 1/2014 | DeVaul | H04B 10/118 244/31 |
| 2004/0257264 | A1* | 12/2004 | Moeller-Jensen | G01N 33/1833 342/52 |
| 2005/0130583 | A1* | 6/2005 | Troutman | H04B 1/3888 455/3.02 |
| 2007/0138336 | A1* | 6/2007 | Palmer | B64B 1/02 244/30 |
| 2009/0224094 | A1* | 9/2009 | Lachenmeier | B64C 39/024 244/13 |
| 2009/0267835 | A1* | 10/2009 | Tietjen | H01Q 1/084 342/368 |
| 2009/0302165 | A1* | 12/2009 | Reinhard | B64D 17/025 244/152 |
| 2010/0270425 | A1* | 10/2010 | Zur | B64B 1/40 244/33 |
| 2010/0315284 | A1* | 12/2010 | Trizna | G01S 7/18 342/123 |
| 2011/0012777 | A1* | 1/2011 | Tomich | G01S 13/0209 342/25 A |
| 2013/0146703 | A1* | 6/2013 | Pecnik | B64B 1/06 244/30 |
| 2013/0175391 | A1* | 7/2013 | DeVaul | G05D 1/104 244/96 |

\* cited by examiner

US 9,720,078 B2

SYSTEM AND METHOD FOR WIDE-AREA STRATOSPHERIC SURVEILLANCE

CROSS-REFERENCE TO RELATED PATENT DOCUMENTS

This patent application claims the benefit of priority, under 35 U.S.C. §119(e), to U.S. Provisional Patent Application Ser. No. 61/638,457, titled "SYSTEM AND METHOD FOR WIDE-AREA STRATOSPHERIC SURVEILLANCE PLATFORM," filed on Apr. 25, 2012, which is incorporated by reference in its entirety.

TECHNICAL FIELD

The patent document pertains generally to radar systems, and more particularly, but not by way of limitation, to a system and method for wide-area stratospheric surveillance.

BACKGROUND

Radar systems are used to detect targets in a variety of environments. Coherent radars are often expensive and therefore may be impractical to use on a large scale. Non-coherent radars are cheaper, but may be less accurate than coherent radars in some environments.

SUMMARY

In various examples, radars and radar processing discussed herein may be implemented using methods as described in U.S. Pat. No. 8,330,647, "Sensor Suite and Signal Processing for Border Surveillance" and U.S. patent application Ser. No. 13/317,099, "DETECTION OF LOW OBSERVABLE OBJECTS IN CLUTTER USING NON-COHERENT RADARS," both of which are hereby incorporated by reference in their entirety.

This document generally describes various embodiments of a low-cost Wide-Area Stratospheric Surveillance Platform (WASSP). WASSP can include a radar system (e.g., a Smart Sensing Radar System (SSRS)-V200 from Vista Research, Inc. of Arlington, Va.) product implemented in a special-purpose launch and recovery package (e.g., a Modular Stratospheric Radar Segment (MSRS)) suspended from a stratospheric balloon (e.g., a balloon from Aerostar, Inc. of Sioux Falls, S. Dak.). While camera sensors have been included as part of surveillance systems, radar systems have not been and many would not consider the use of non-coherent radars for performance reasons. In an example, a radar system is included, because a smart sensor radar processor may make detection of land, maritime, and/or air targets possible from a stratospheric balloon platform. Additionally, the use of a freely moving stratospheric platform or quasi-stationary stratospheric platform with a radar, as described in various examples, has not been tried before. In various examples, the power spectrum is computed and processed when using a WASSP.

One or more embodiments, can have uses in defense, homeland security, intelligence agency endeavors. For example, WASSP can provide the Air Force with a tactical weather-resistant, high-altitude Intelligence, Surveillance, and Reconnaissance (ISR) capability that can be launched from shipboard or a small land area in a short-period of time, such as less than 30 minutes. The radar system can enable all-weather tracking of low-observable land (e.g., personnel or small vehicles, among other objects) and maritime (e.g., small boats or other water craft) targets to ranges over 100 km radius and greater than 30,000 km$^2$ in area.

FIG. 1 illustrates an example of output from a video simulation of the coverage from WASSP and demonstrates an example of a free-floating balloon mission using actual wind data from the region. FIGS. 2 and 3A/3B illustrate an example of the MSRS with the radar system in both launch and recovery configurations (FIGS. 3A/B) and in surveillance configuration (FIG. 2). The total platform can weigh less than 250 lb. The platform can include an antenna with an aperture of 8.5 ft. that rotates 360° to provide Wide Area Surveillance (WAS) coverage. In one or more embodiments, a WASSP includes two Technology Readiness Level (TRL) 9 products, a Vista SSRS and an Aerostar stratospheric balloon platform.

WASSP can be a relatively affordable tactical ISR system that is designed to be launched, recovered, and re-flown. Because of its low cost, it can be operated in an expendable mode, such as when used in an area where recovery may not be practical. WASSP can be launched in less than 30 minutes by a 2-person crew. WASSP can move to an altitude of 65,000 to 80,000 ft., where it can slowly drift (e.g., with the wind) over the coverage area. At such altitude, WASSP can be difficult to detect. Even if detected, and even if shoot-down were possible, the cost to shoot down a platform at these altitudes can exceed the WASSP cost.

The WASSP radar can cover, for example, a 100-km radius (200-km diameter coverage region) and can provide tracking for one or more targets of interest within the coverage region for a period of about 8 to 48 hours over each location with each sortie (e.g., deployment). In embodiments using TRL-9 balloon platforms, WASSP can provide a low-risk combination of technologies for proving the feasibility of radar missions at these altitudes. As station-keeping airship technology matures, coverage can be expected to extend over a location for about a month. By launching a WASSP system every 7 hours from a ship in the Persian Gulf, continuous high-resolution coverage of nearly the entire region can be achieved. Each location of interest along the trajectory can have 11 hours of continuous radar surveillance with each deployed WASSP system. The trajectory in FIG. 1 shows WASSP payloads landing on command in a recoverable area where the radar units can be picked up and returned for reuse.

The high-performance SSRS Wide-Area Surveillance (WAS) capabilities have been validated in extensive Office of the Secretary of Defense (OSD) Assessment Development Group (ADG) tests. The OSD ADG have used WAS Radar-Aerostats in Afghanistan Forward Operating Bases (FOBs). Due to its stratospheric ISR capability, WASSP can extend the coverage of proven 360° SSRS land-maritime radar capabilities to automatically track and identify low observable (e.g., Radar Cross Section (RCS) less than 1 m$^2$) targets of interest, such as dismounted walkers to 65 km range (e.g., greater than 8,000 km$^2$) and small vehicles and boats to over 100 km range (e.g., greater than 30,000 km$^2$). Such tracking and identification can be in oversea conflict areas, and can be accomplished without operator adjustment or interpretation. WASSP can provide wide-area Situational Awareness (SA) (e.g., directly) from a stratospheric ISR platform to authorized mobile users with a SSRS "Stratospheric IP in the Field" tactical network.

WASSP can be useful in high-terrain conflicted or denied areas where sensors require high grazing angles for effective ISR or military communications (Comms), and in areas where country-wide and deep cross-border ISR may be desired. This disclosure addresses United States Air Force (USAF) critical security areas and Joint Urgent Operational Needs (JUON) for wide-area surveillance. OSD ADG test results indicate the SSRS radar can have a 99% probability of tracking low observables with a false track rate of less than about one per six hours in diverse weather, land-sea clutter, and terrain.

Warfighter benefits can include improved radar performance and wide-area situational awareness already proven on Afghanistan SSRS programs. Additional unique WASSP benefits include increased tracking coverage from a single location (due to altitude), low purchase and operating cost, expendability, survivability in conflicted areas, automated tracking while remaining undetected by targeted objects, and a "Stratospheric IP in the Field" situation awareness network for wide-area support to authorized users during Combat Search And Rescue (CSAR) operations in hostile areas.

BRIEF DESCRIPTION OF THE DRAWINGS

Some embodiments are illustrated by way of example and not limitation in the figures of the accompanying drawings in which.

DETAILED DESCRIPTION

In various embodiments, a stratospheric, weather-resistant, low-cost, wide-area surveillance system can include a high-performance tracking radar system mounted on a stratospheric balloon platform for situational awareness of land and maritime targets. A WASSP can address a USAF desire and a JUON desire for enhanced ISR with a unique, affordable, surveillance capability not presently available to the USAF or any of the military services. In various embodiments, the WASSP can include two TRL 9 Commercial Off-The-Shelf (COTS) systems, an SSRS provided by Vista Research, Inc., and a stratospheric balloon platform provided by Aerostar International, Inc. At a planned mission altitude, the WASSP can be difficult to detect by the targeted objects. The WASSP can be a relatively low-cost radar system, with relatively low surveillance operating costs.

An SSRS can be deployed for wide-area tracking of land, maritime, and air targets, from tower, vehicle, ship, and aerostat platforms. The SSRS can be for wide-area persistent surveillance applications using low-cost radar systems. The SSRS radar system can operate from all of these platforms without the motion of the platform impacting its performance, and it can take advantage of higher elevation to see targets that are hidden from view at lower elevations. Real-time tracking functions (e.g., algorithms developed by Vista) can use Bayesian Track-Before-Detect processing over a 360° radar field-of-regard to obtain a high probability of detection (>99% for small (RCS<1 $m^2$)) and/or slowly moving targets (velocity~1 m/s) for maritime (e.g., jet-skis, speedboats, ships, or the like), land (e.g., people, groups of people, small vehicles, or the like), and air (e.g., ultra-lights, Unmanned Aerial Vehicles (UAVs), small aircraft, or the like) applications, and a very low false track rate (e.g., less than one false track per six hours). A more detailed description of the capabilities of example SSRS and Smart Sensor Radar Processor (SSRP) systems is presented in this disclosure as well as in the methods of '647 Patent and '099 Application, which have been incorporated by reference.

Figure 2:
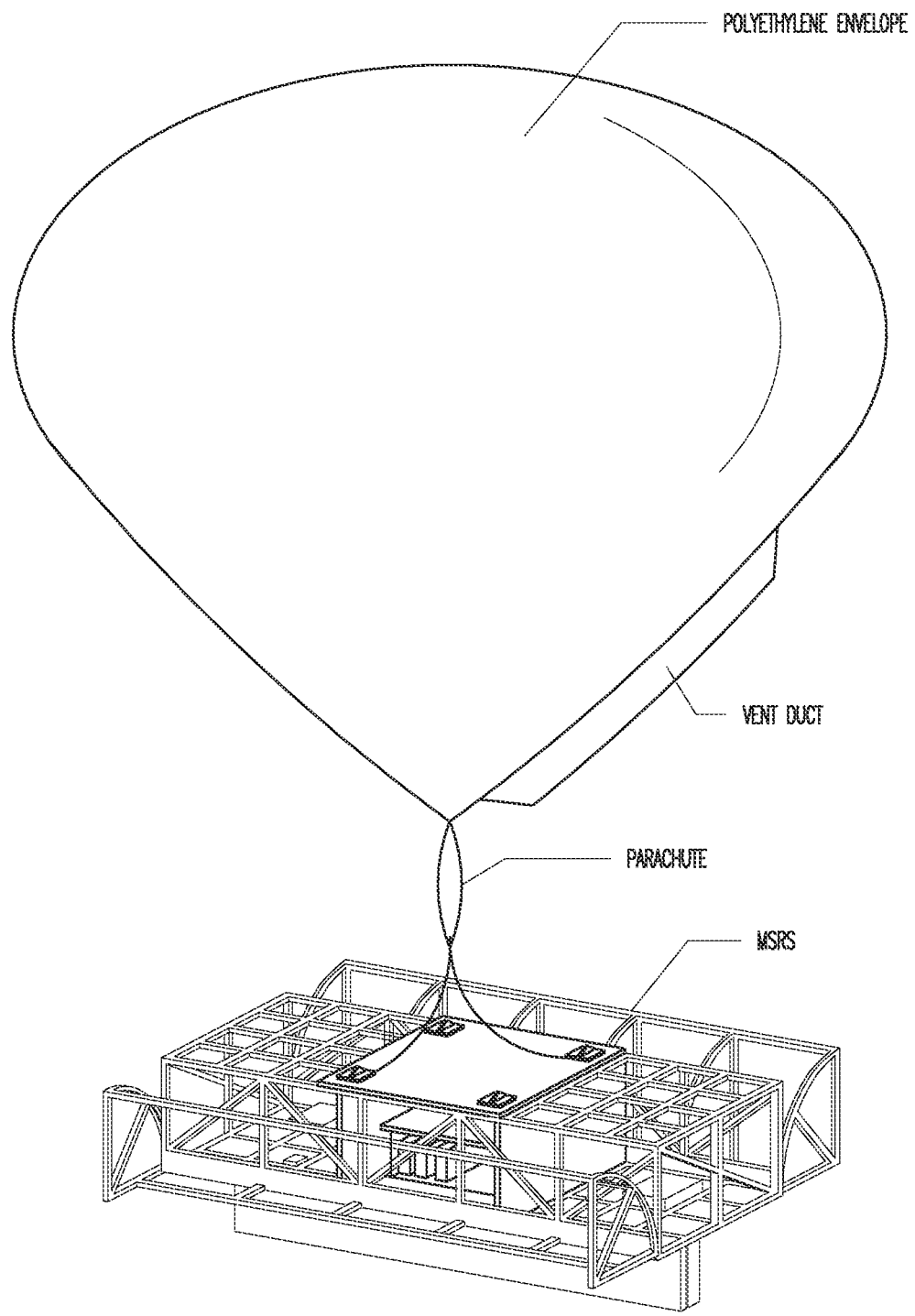
FIG. 2 illustrates an overview of a Wide-Area Stratospheric Surveillance Platform, according to an example.

As illustrated in FIG. 2, the WASSP system can include two segments. The first segment can be a Stratospheric Balloon Segment (SBS), which can be a TRL-9 COTS 68,000 cubic foot Aerostar product that can bring the radar system to an elevation of 65,000 ft. (or higher), and the second can be a MSRS, which is a modular package configured for operation with the SBS at the altitudes and conditions found between 65,000 ft. and 80,000 ft. The MSRS can be suspended from the balloon, and is capable of lifting 250 lbs. to the required altitude.

Figure 3A:
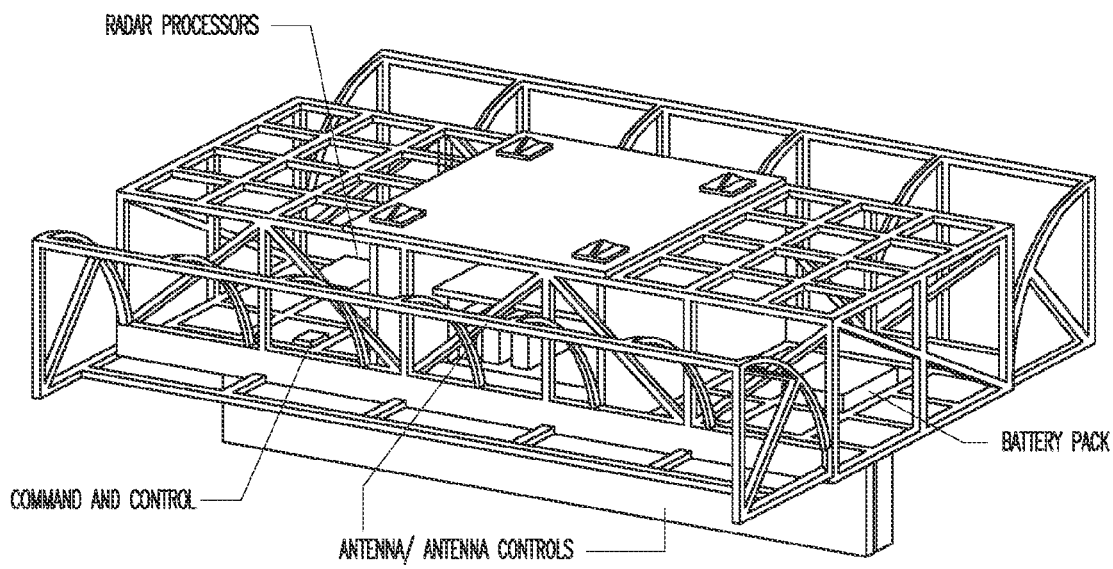
FIGS. 3A and 3B illustrate an overview of a Modular Stratospheric Radar Package, according to an example.
Figure 3B:
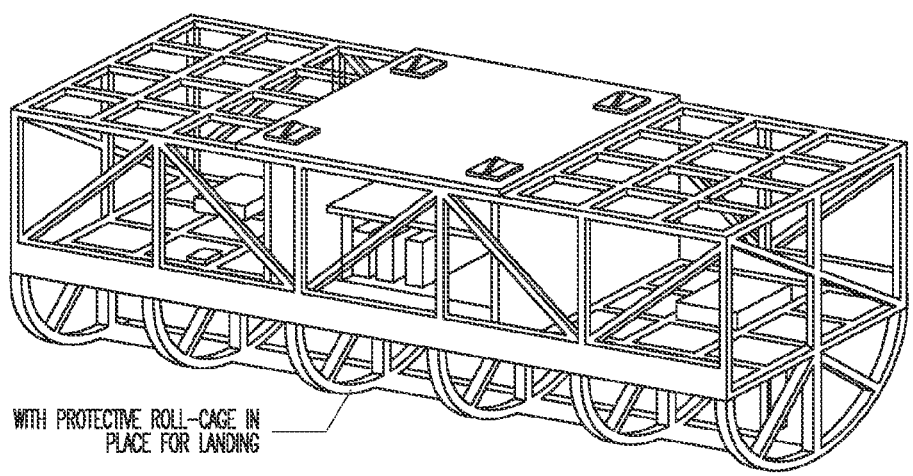

In an embodiment, the protective roll-cage shown at the bottom of FIG. 3B is designed to protect the system for recovery during parachute landing. The MSRS can be designed as a modular system and can include five assemblies: (1) a command and control assembly; (2) a battery pack; (3) a radar processor (e.g., with data recording for checkout testing); (4) radar electronics; and (5) an antenna or antenna control. A ground station module can be implemented (e.g., based on a mobile Persistent Ground Surveillance System (PGSS) ground station for Unmanned Aircraft System (UAS) and aerostats) to track the position and coverage area of the WASSP over time and to display the tracks of the detected targets on a map of the coverage area.

In various embodiments, the WASSP is an affordable tactical ISR system that is designed to be launched, recovered, and re-flown. It can be launched from the deck of a ship, or from a small truck or trailer, or from the land. The WASSP can cover a surveillance region of over 200 km in diameter from an altitude of 68,500 ft. In part because of its low cost, it can also be operated in an expendable mode if used in an area where recovery may not be practical or possible.

In an example, a land launch can include an Aerostar stratospheric balloon carrying a UAV. A land launch can include enough space to lay out the balloon on the ground so that it can be filled with helium and launched, such as from a single location. The balloon can have a volume of about 13,000 $ft^3$ and be designed to carry a 50-lb payload to 65,000 ft. In an embodiment, the launch of the balloon takes about 10 min exclusive of any payload checks. This time includes the layout, inflation, and release of the balloon.

In various embodiments, the WASSP can be launched so that once it reaches a surveillance altitude (e.g., about 65,000 to 80,000 ft.), it moves with the stratospheric winds until it is over or within range of the surveillance region.

Figure 4:
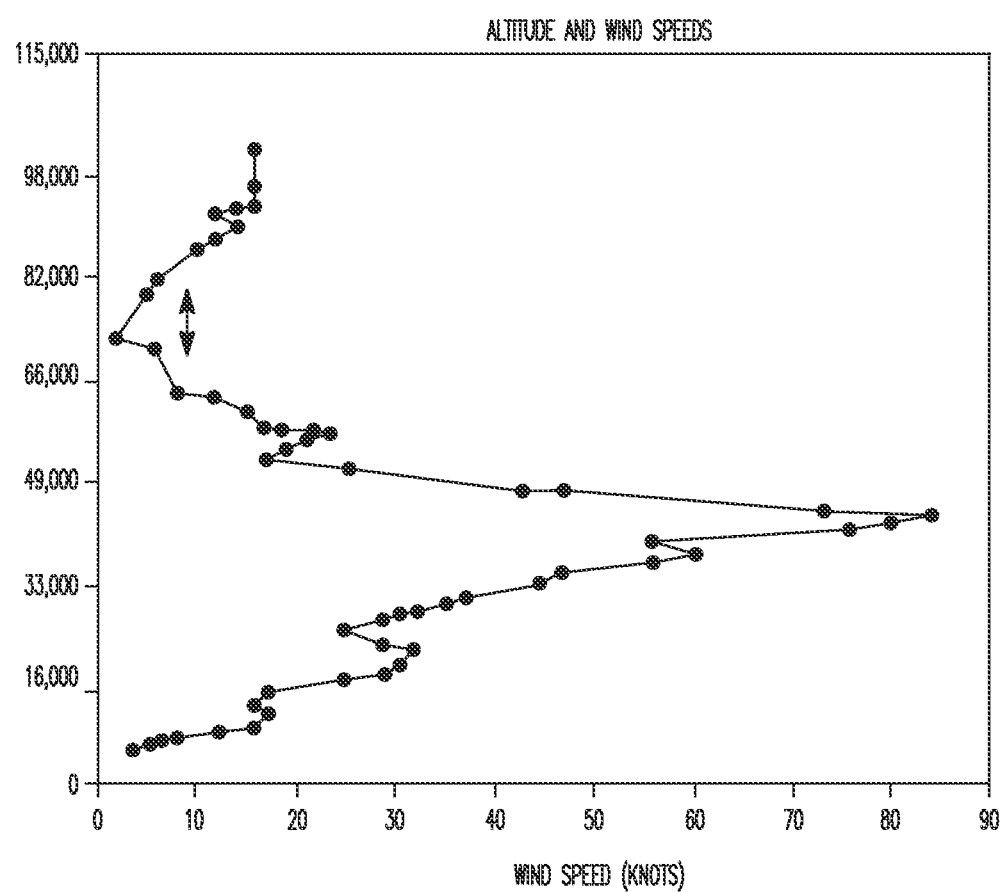
FIG. 4 illustrates a vertical profile of atmospheric wind speed as a function of elevation, according to an example.

FIG. 4 shows an example of a vertical profile of wind speed with a minimum in the wind speed found in the stratosphere where flight operations can be used with the various examples described here. The vertical profile is of the atmospheric wind speed as a function of elevation in feet. Note the minimum at 68,500 ft. in the stratosphere. (X: 0-90 kt.; Y: 0-115,000 ft.)

Figure 1:
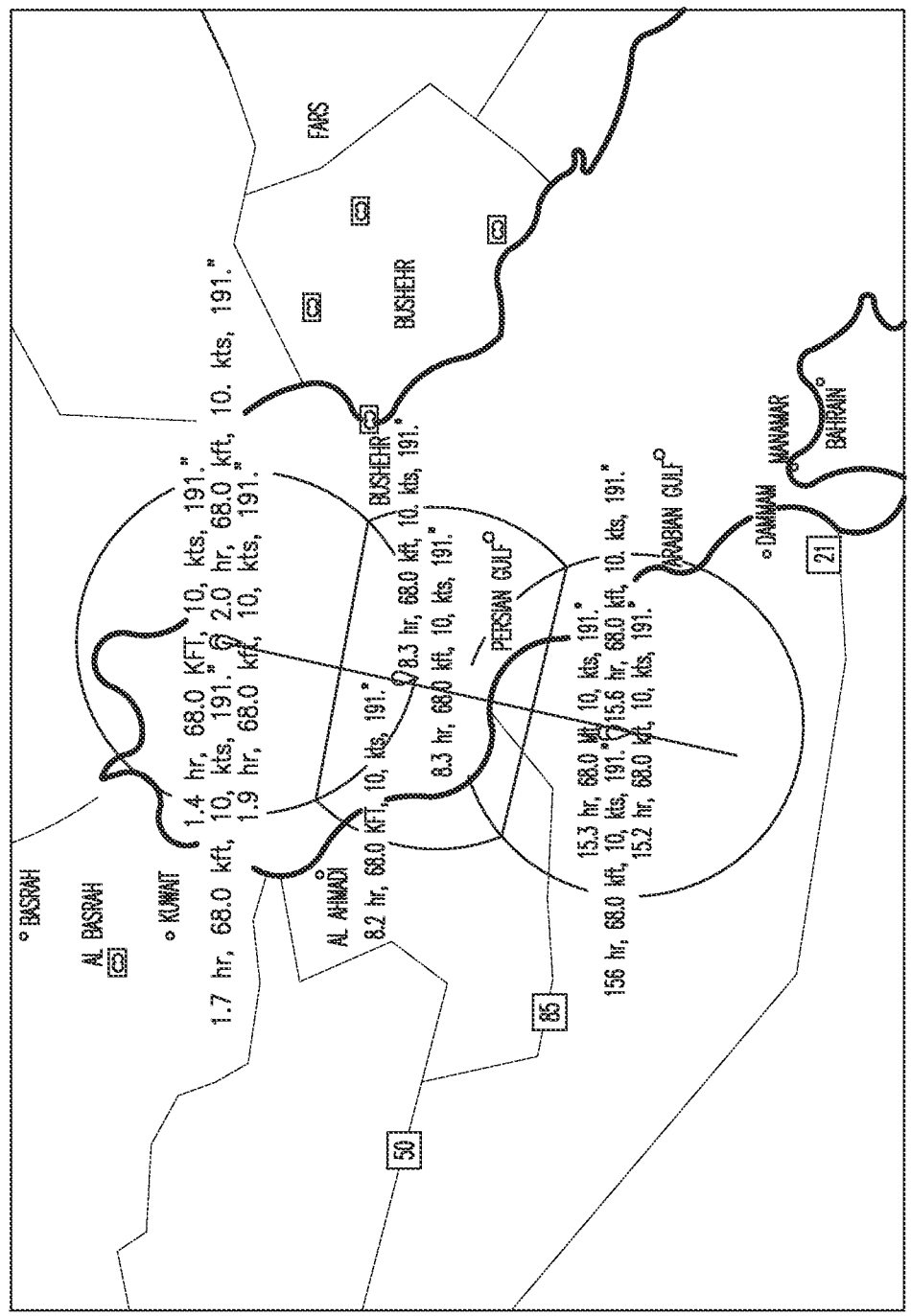
FIG. 1 illustrates a simulation of Wide-Area Stratospheric Surveillance Platform Coverage using actual wind data, according to an example.
Figure 5:
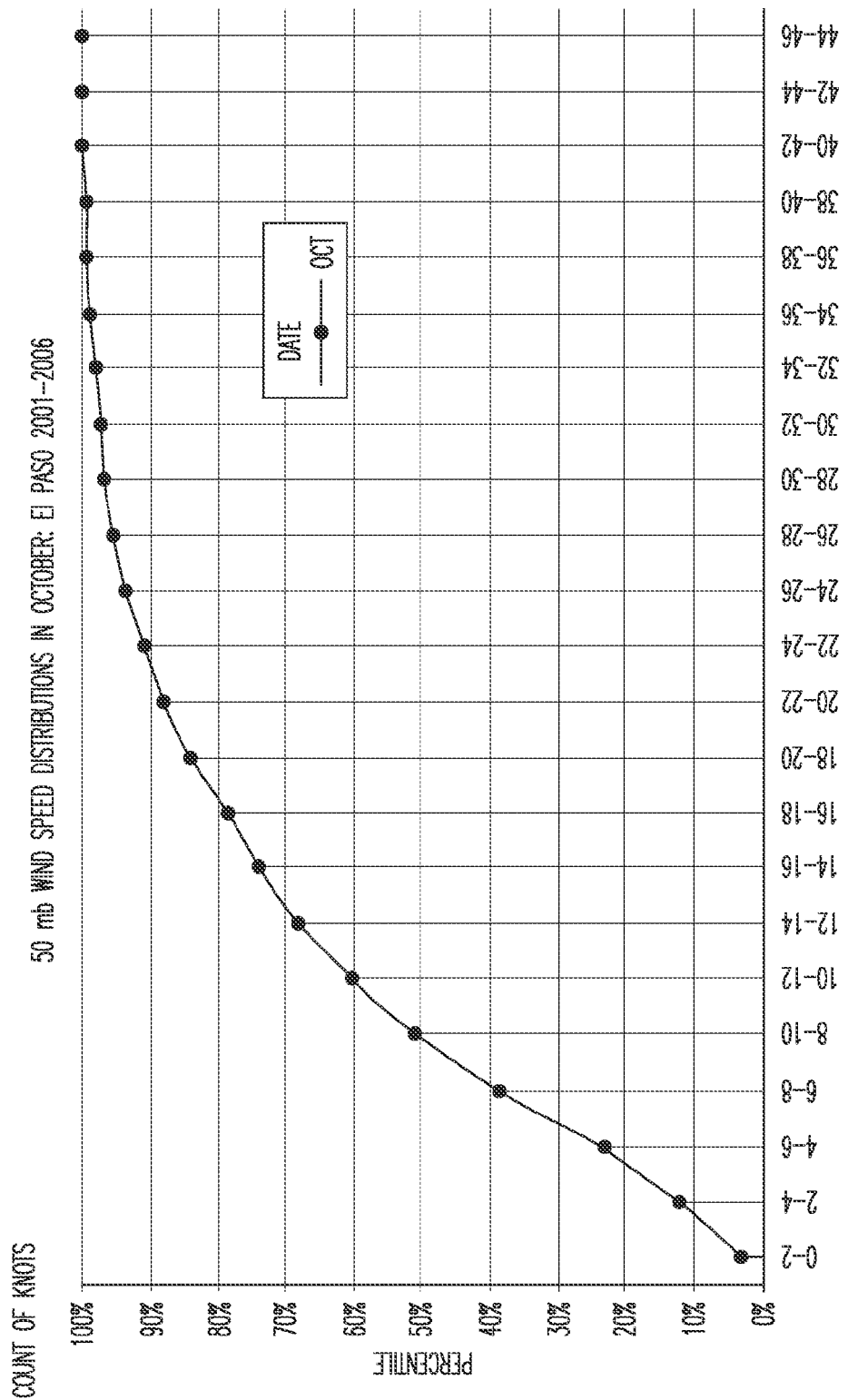
FIG. 5 illustrate an analysis of winds over El Paso, according to an example.

FIG. 5 illustrates a Cumulative Frequency Distribution (CFD) graph for El Paso, Tex. for the month of October compiled from data collected over a 7-year period from 2001 through 2006 at 50 mb. The plot (X: 0-50 kt.; Y: 0-100%) indicates the percentage of the time that the wind speeds (in knots) are less than or equal to the wind speed on the x-axis with high winds speeds (e.g., greater than 20 knots) occurring 10 to 20% of the time. The median (50%) wind speed is 8 to 10 kts. As illustrated the wind speed is <10 kts 51% of the time in October. The actual wind speeds on the day of a launch can be known or predicted and the number of launches and coverage area can be computed from these wind speeds. At 10 knots, the radar can cover an area with a diameter of about 200 km in a period of about 11 hours, which means that the coverage of a WASSP at any location along the trajectory of the WASSP is 11 h. For continuous coverage, like that illustrated for the Persian Gulf in FIG. 1, a WASSP can be launched about every seven hours. At wind speeds of about 2.5 knots, the coverage time can be about 44 hours or about two days. At wind speeds of about 25 knots, the coverage time is can be less than four hours. Wind speeds can be generally lowest during the non-winter months (e.g., April-October in the United States) and the wind speeds can increase during the winter months, but winds during the winter are low enough to allow operation of the WASSP.

FIG. 5 is illustrative of an example of the type of winds anticipated at the flight altitudes of interest. The figure illustrates that the wind speeds in the proposed stratospheric flight region can be low enough to successfully operate the system. The actual wind velocities, of course, depend on location and season, and can be different depending on the day or time of operation. In an embodiment the coverage area and the time on station is dependent on the atmospheric wind speeds at altitude and the capability of the radar. Aerostar has accumulated a library of stratospheric wind speeds at 50 and 70 mbar and compiled CFDs as a function of location and month/season like the one shown in FIG. 5. Up to one or more days of coverage with one or more WASSPs can be possible. The surveillance range can be over 200 km and the surveillance time can typically range between about eight hours to two days.

In various embodiments, the command and control assembly includes a Global Positioning System (GPS) module, a Federal Aviation Administration (FAA) transponder control, primary flight termination system, backup flight termination system, discrete relay control for external payloads, analog voltage readings from external payloads, and external RS-232 (or other communication protocol) payload command interface. Telemetry data can be passed to the ground station by a 900 MHz line-of-sight link. For tests conducted with the real-time radar, a client display can be used to display and interact with the target tracks generated by WASSP. Many different communication links can be used, such as a long-range (500 nm) OTH link.

Power budget calculations were made for the WASSP system that indicate that a single 55 lb. battery can be sufficient for WASSP operations of about 24 hours or less. Calculations can be made to determine whether or not solar power should be added to the system. In an example, the battery can be flown on balloon flights at altitudes above 130,000 ft.

The efficiency of a battery at the temperature conditions found at altitude can be about 50%. The excess heat generated from the radar system can be directed to the battery assembly via a heat pipe to heat the battery assembly and increase its efficiency. This implementation can have one or more advantages including removing excess heat from the system or increasing the life of the battery.

Figure 6:
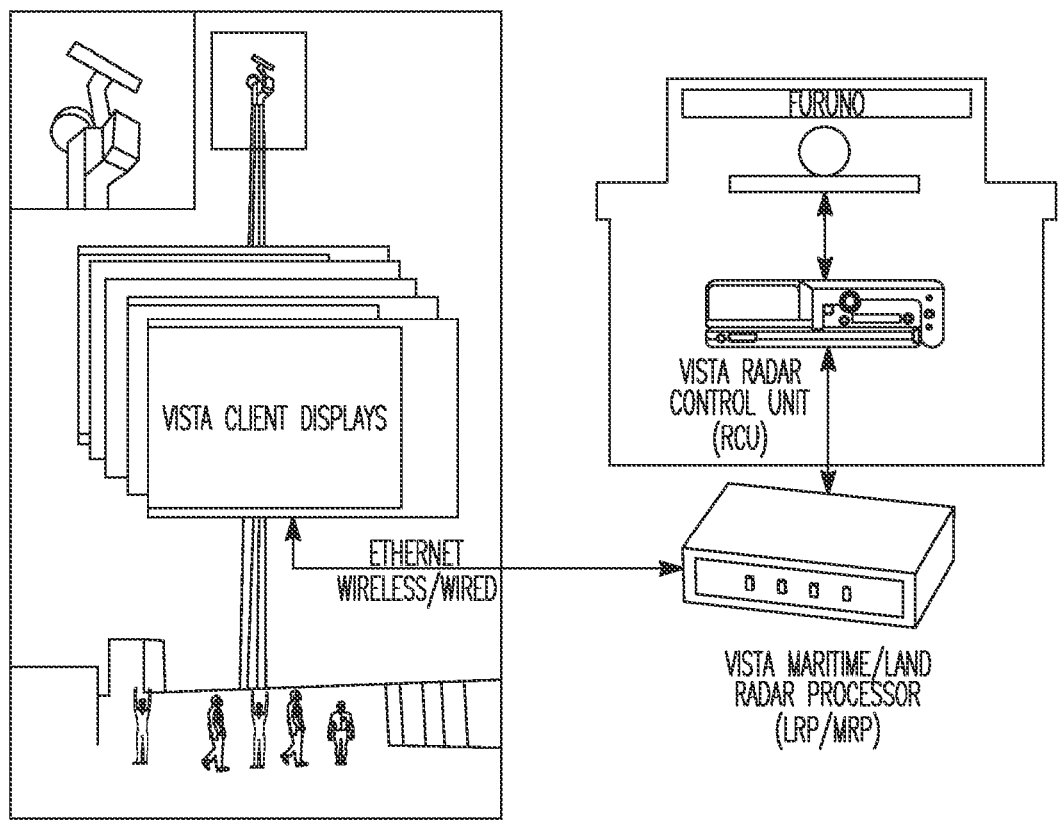
FIG. 6 illustrates an overview of a smart sensor radar system according to an example.

The SSRP shown in FIG. 6 can be used to acquire, digitize, or otherwise process data from the WASSP. Target tracks, target information, and relevant environmental and control data can be transmitted via a wireless data link to a ground control station for use on a client display. The client display can be used in maritime and land radar applications. For radar tests, the radar data can be recorded on disk (e.g., solid state disk drives), such as for post-test analyses. The SSRP processor can be sealed and conduction cooled. This can be done through heat conduction to the battery, where the heat can be used to keep the battery warm and increase the efficiency of the battery. The radar data recorder can be based upon the S902R sealed computer from General Microsystems Inc. of Bellevue, Wash. The MS S902R is a fully sealed and rugged computer with a solid-state drive array.

In various embodiments, the SSRP shown in FIG. 6 is a specially packaged supercomputer that digitizes raw video I and Q output from the radar receiver and processes it using one or more algorithms (e.g., proprietary algorithms). In various embodiments, the algorithm implementation can use existing tracking algorithms that are incorporated in the SSRP. For example, real-time detection and tracking algorithms can include full Bayesian track-before-detect processing for a 360° radar field-of-regard, which can be executed in the SSRP. The SSRP system can be hosted in a rugged box, such as a 4 U (7 in.) high by 21 in. deep box based on a military qualified system. In an embodiment, a Remote Control Unit (RCU), also shown, can allow the radar to be operated at remote locations, such as can be used in tower, building, aerostat, and mobile vehicle platforms. When the radar already exists and provides appropriate information to the SSRP, such as already exists in most ships with TARS, the RCU may not be needed. The SSRP tracking system can develop and maintain track on many thousands of targets in the surveillance region. In various embodiments, both the RCU and SSRP come in indoor and outdoor mechanical packaging. The SSRP can be offered as two distinct products, one for maritime applications and one for land targets. The distinct products include a Land Radar Processor (LRP) for detection and tracking of people, vehicles, and low-flying aircraft, and a Maritime Radar Processor (MRP) for detection and tracking of small craft, boats, ships, and low-flying aircraft.

In various embodiments, the performance specifications for SPRS systems delivered to oversea areas have been rigorously tested and proven at US Government integration sites and controlled FOB test ranges (test sites located in Arizona, Colorado, and North Carolina) by several assigned independent test agents for the Government (including APL). Controlled FOB protection tests and operator training can be conducted by the Government with SSRS in oversealike environments, including desert summer conditions, high altitude, and complex terrain. SSRS systems can meet MIL-STD-901 and MIL-STD-167 standards requirements. Data streams can use sockets (e.g., TCP/IP) to expose data in a continuous manner without requiring requests from the end user. An SSRP can be capable of streaming data in a number of formats including, but not limited to, eXtensible Markup Language (XML), National Marine Electronics Association (NMEA), or binary, among others. To utilize a data stream a user can know the SSRP host name or IP address and/or the Transmission Control Protocol/Internet Protocol (TCP/IP) port that the data is exposed on. Multiple data streams can allow multiple simultaneous client connections in accordance with a system Interface Control Document (ICD). In various embodiments, the SSRP can be integrated with over 10 different coherent and non-coherent radars.

In an embodiment the power consumption of the S902R is less than 50 W and the weight of the S902R is less than 2.5 lb. The S902R can be packaged in a rugged sealed enclosure with the Radar Control Unit, which can include a digitizer card, timing signals and provide thermal coupling to the battery. The data to be recorded can be raw In-phase/Quadrature (I/Q) data from the coherent radar receiver, which can implement 500:1 pulse compression. These inputs can digitized in 16-bit samples, for example, and at a rate sufficient to meet the bandwidth requirements. Processing can be done digitally in the SSRP processor. The data can be Doppler processed and then entered into a Bayesian track-before-detect radar processor (e.g., a radar processor from Vista). Tracks can be mapped into ground coordinates and transmitted over a wireless link by the real time processor. In some tests (e.g., initial tests), the data can be simply stored and processed on the ground.

In various embodiments, there are several alternatives to the recorder configuration, including using the Mercury SBC3510 Single Board Computer or the 6 U module LDS6521. These single-CPU modules are available conduction cooled and rated to 68,500 ft., with the caveat that it is the responsibility of the user to keep the conduction-cooled card edges at 71° C. The cards have a Switched Mezzanine Card/Peripheral Component Interconnect (PCI) Mezzanine Card (XMC/PMC) mezzanine site for the digitizer card, which can be the dual-channel Mercury Echotech ECV4-2 PMC card. The cards can be mounted in a sealed and conduction cooled enclosure such as the Dawn VPX 3 U conduction cooled enclosure for UAV applications.

For the fully integrated and deployed system, most or all of the processing can be done on the WASSP MSRS. In one or more embodiments, the data may not be recorded. In such embodiments, only the output tracks may be provided to the client display on the ground station, such as can be similar to the other SSRP and SSRS applications. The radar processor can run on Intel® Central Processing Unit (CPU) hardware, but other hardware may be used. These modules can be checked to verify they can operate under the deployed conditions. Heating of the processor or changing some of the internal modules may be used in testing.

In various embodiments, the WASSP radar is a modified Kelvin Hughes radar unit, which has a 200 W peak power, fully coherent pulse-Doppler system with high pulse compression capabilities. The WASSP can include the waveform generation, RF transmitter and receiver components, and IF components to produce baseband I and Q channel signals, and radar Pulse Repetition Frequency (PRF) timing signals for the processor and data recording use. In an embodiment, the radar assembly accepts the antenna position encoder signal from the antenna controller and can supply this signal to the processor.

In an embodiment, the Radar Electronics Assembly (REA) is packaged in a modular box and can provide heat transfer from the transmitter power amplifier to the power assembly, such as to dissipate heat from the power amplifier. This heat transfer can be done via a heat pipe subassembly, because normal convection cooling may not be effective at some operational altitudes. This assembly can include a Kelvin Hughes transceiver along with the necessary power conditioning and signal transfer electronics needed. The coupling to the antenna can be through a WR-90 waveguide, for example.

The Kelvin Hughes system can be normally used in marine radar applications with the antenna scanning controlled by another assembly supplied with that radar system. For the WASSP, in an embodiment, the Kelvin Hughes antenna scanner can be replaced by a Vista antenna and antenna control assembly.

A special antenna can used in WASSP. The antenna beam can be narrow in both azimuth and elevation. Both the antenna position relative the modular assembly and the rotation rate of the antenna can be controlled to obtain accuracy in target location estimation.

In an embodiment, the antenna is designed to provide a one-way half power beam width of about 0.75° in azimuth and about 6.4° in elevation giving a directivity of about 39.3 dBi. The antenna can include a plurality of waveguides (e.g., fourteen) stacked vertically with the face of the antenna tilted down, such as by about 15 degrees, from the horizon. The antenna polarization can be approximately horizontal and a 9.41 GHz power can be split into channels to feed each of the waveguides. In an example including 14 waveguides, the power can be split into 14 channels. The losses of the splitter, waveguides, and connections can be about 2.2 dB, so the net antenna gain can be about 37.1 dBi. FIG. 3A shows the front of the waveguide antenna assembly, according to an example embodiment.

In various embodiments, the azimuth pattern is achieved by using a standard WR90 aluminum waveguide (e.g., about 0.400"×0.900" inside dimensions with 0.050" walls). In an example, slots can be cut in its narrow wall and the slots can be slightly tilted to achieve a desired distribution over the length of the guide. Each waveguide can be end-fed through a waveguide 2-way splitter and an output from one of two strip line 7-way dividers.

Figure 7:
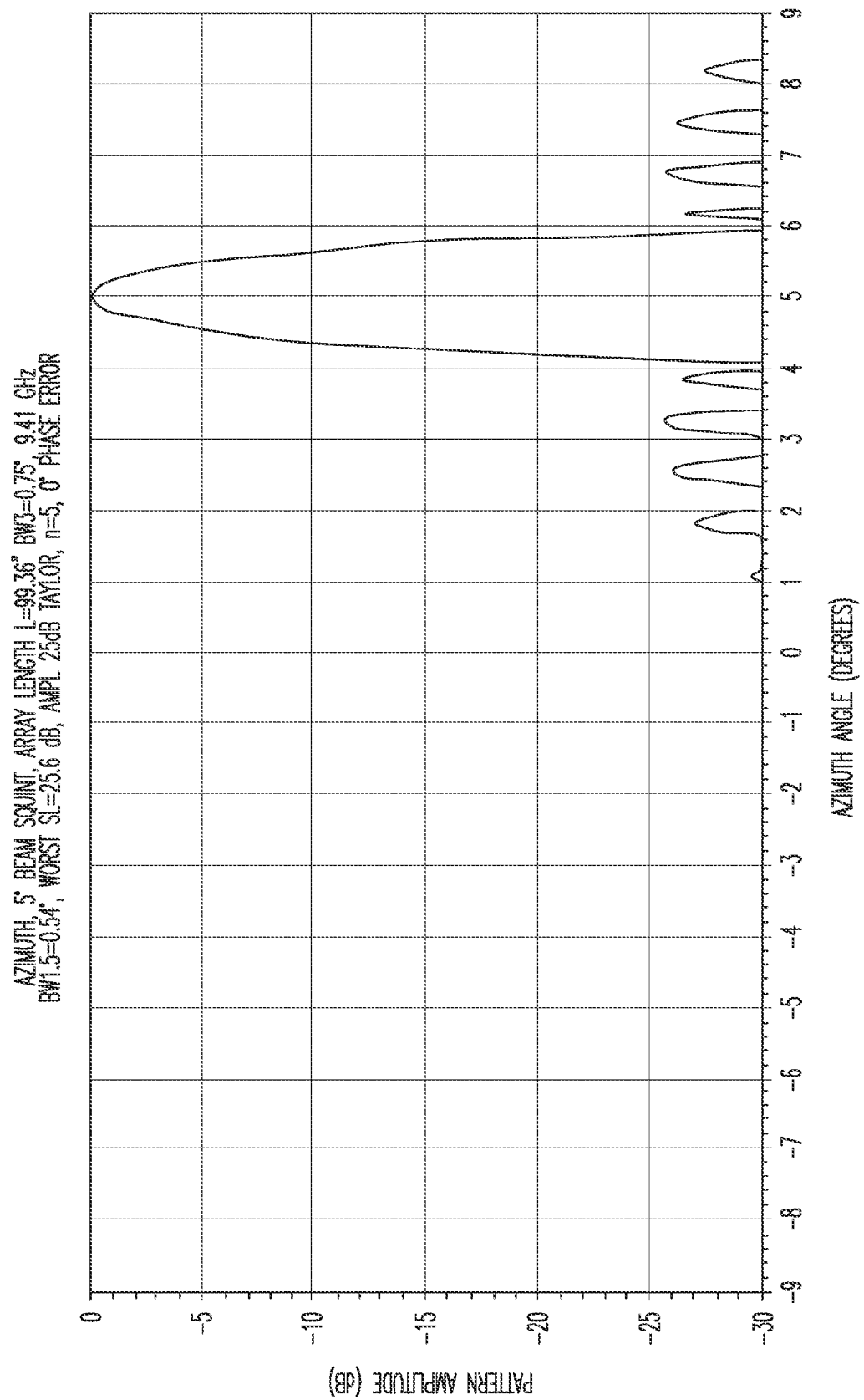
FIG. 7 illustrates an antenna azimuth radiation pattern, according to an example.

In an embodiment, the far end of the waveguide is terminated (e.g., grounded) to prevent the small amount of energy remaining to not be reflected back toward the source. The slots can be spaced so that the phase of the radiation from them is proper to form a beam approximately perpendicular (broadside) to the length of the waveguide. The amount of radiation by each slot can be a function of the tilt from vertical of the slot. The radiated amplitude distribution across the length of the waveguide can be a Taylor 25 dB distribution, such as to give low side lobes in a reasonably efficient aperture. Such a configuration can provide a beam peak that is squinted about 5° from broadside in the direction of the terminated end of the waveguide. The squint angle can change with frequency at a rate of about 0.008 degree per MHz. In various embodiments, the antenna design is a non-resonant array to permit operation over a 300 MHz bandwidth. The antenna design can be centered at about 9.41 GHz. In an embodiment, the slots can be spaced about 0.996 in. apart, and 100 slots can be used to give a radiating aperture of about 100 in. (8.25 ft.). The one-way half-power beam-width can be about 0.75 degrees and the two-way half-power beam-width can be about 0.54 degrees. An example of a one-way azimuth radiation pattern is shown in FIG. 7.

Figure 8:
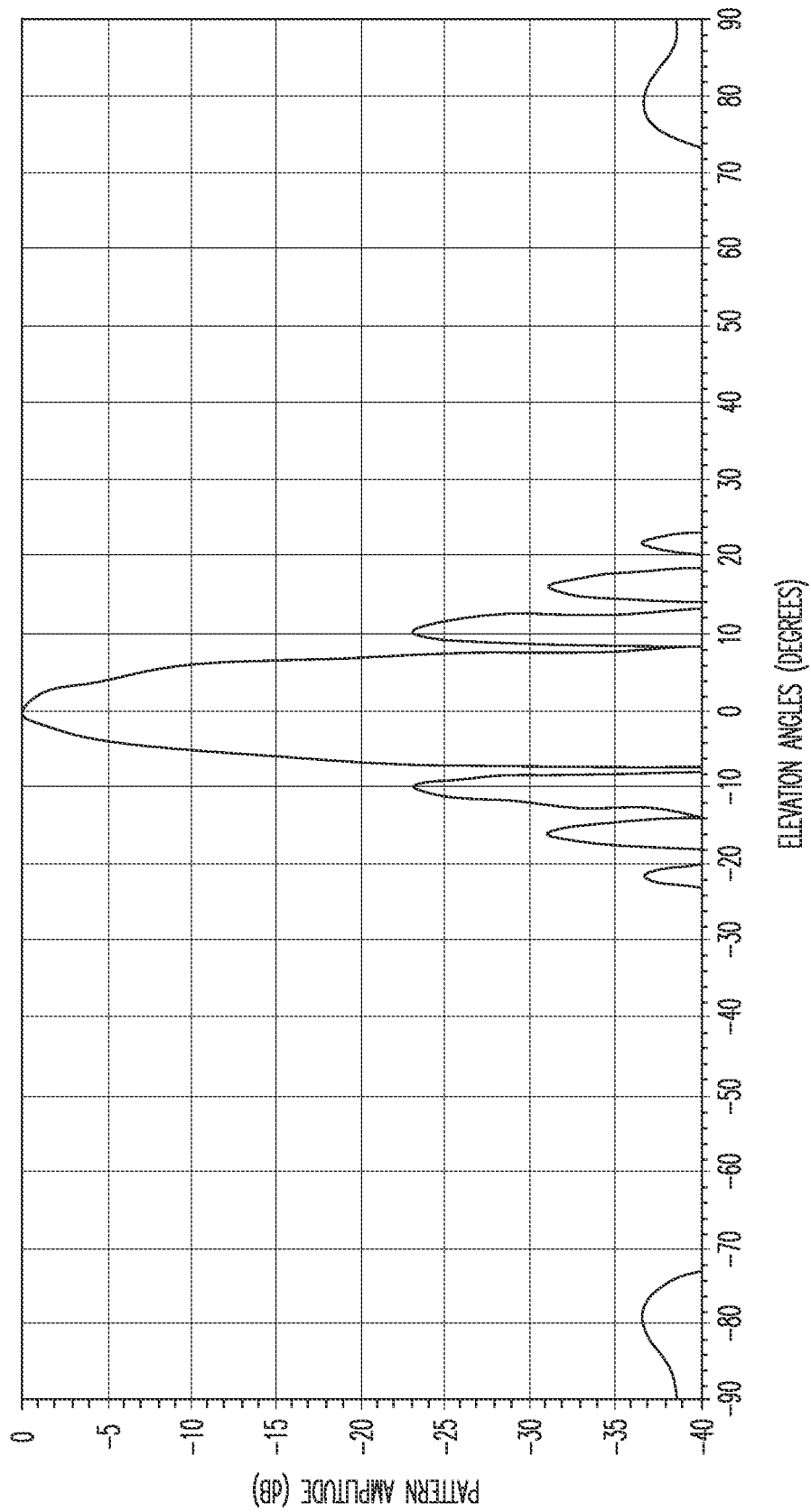
FIG. 8 illustrates an elevation pattern of a waveguide antenna, according to an example.

In various embodiments, the elevation configuration can be an array of 14 radiators, as described above, about equally spaced vertically and all fed in phase to form a beam perpendicular to the surface. The elevation pattern of a single waveguide can be broad. A narrow elevation pattern of about 6.4 degrees can be obtained from 14 waveguides spaced about 0.93 inches apart. The power can be split to provide a modified cosine amplitude distribution across the vertical aperture, so as to provide about 23 dB sidelobes. The one-way half power beam width can be about 6.38 degrees and the two-way half power beam width can be about 4.56 degrees. An example of an elevation pattern of a waveguide antenna is shown in FIG. 8.

The power handling capability of a WR90 can be conservatively rated at about 200,000 W at sea level and at about 15° C. At an altitude of about 68,500 ft. and at about −55° C., this degrades to about 7,000 W. Thus, there can be a considerable safety margin for the transmitter power of this radar.

In various embodiments, the antenna controller includes an antenna rotation motor, a closed-loop motor controller, position encoder, position encoder signal conditioning circuit, and a DC-DC-converter. A motor control subassembly can provide the mounting position for the antenna support and rotator shaft. FIGS. 3A and 3B illustrate an example of an antenna controller between a radar assembly and an antenna.

In an embodiment, the rotation motor can be a direct-drive DC motor, such as a direct-drive DC motor with a maximum torque of about 2.8 ft-lbs. Such a motor can bring the antenna rotation up to its speed of 1 RPM in approximately 30 s. A maximum of about 5 W can be used during the startup interval. After the antenna is rotating at speed, the speed can be maintained within about 0.05%, and the position reporting accuracy can be about the same. With the signal conditioner power requirements and the DC-DC converter efficiency, this unit can operate nominally at about 10 W total, at least two different voltages (e.g., 12 VDC and 5 VDC).

In various embodiments, the radar assembly houses a modified Kelvin Hughes radar system. The radar assembly can be located above the antenna controller assembly. The radar unit and the antenna can be interfaced via a WR90 waveguide from the radar transceiver to the antenna feed guide through an access hole between the two boxes. Screws (e.g., flange screws) for this connection can be accessible from one side of each box. The radar assembly can include a DC-DC converter, such as to condition the battery power to the limits needed by the Kelvin Hughes radar unit. This converter can be controlled via a relay from the Processor/Recorder assembly. The radar can nominally consume about 200-210 W at about 18-33 VDC.

In various embodiments, a Radio Frequency (RF) power amplifier in the radar unit can perform better if some heat is dissipated therefrom. Since convection cooling may not be readily available at about 65,000 to about 68,500 feet altitude, the radar unit can be mounted on a heat pipe evaporator element, such that the heat can be transferred upward to the power assembly, where the condenser for the heat pipe can be in contact with the battery pack. Such a configuration can have the effect of using the batteries as heat sinks for the power generated by the radar frequency power amplifier.

In an embodiment, the antenna is suspended below the electronics modules and can scan at a rate of about 1 RPM, for example. The rotating elements can be configured to be balanced and can include the ability to add weight as required. FIG. 3A shows an example of the antenna and lower payload assembly.

The antenna can be made of three functional sections: (a) the active array, including slotted waveguide elements; (b) the support frame; and (c) a structure to support and to position the array elements. The support frame can attach the whole to the rotator shaft and the electronics modules.

The active array can include parallel aluminum waveguides (e.g., 14 parallel waveguides). In one or more embodiments each waveguide can be about 8.5-ft. long and spaced at intervals of about 0.93 in. The waveguides can be machined in a precise rigid fixture and restrained in the antenna support structure in the same rigid position. The waveguides can be precisely located on the frame and held rigidly in parallel positions.

In various embodiments, the support frame is a bolted and brazed assembly. The support frame can carry the power splitters, and a feed waveguide that connects the radar to the antenna and provides attachment to the rest of the system. The rotating shaft can be attached to about the center of the top beam of the support frame. In an embodiment that includes a radome, the radome can be made of about 0.06-in. Fiberglass Reinforced Panels (FRP) and can add about 45 lbs. to the system weight.

In various embodiments, the rotating mass can weigh about 61 lbs. and can have a moment of inertia of about 130 lb. in s$^2$. An angular momentum from a configuration of 1 RPM may not include rotational stabilization. Stabilization is possible and can include adding a counter rotating mass (e.g., a flywheel) between the motor and the antenna. A second motor can be used with electronic rather than mechanical gearing to help stabilize the system.

In an embodiment, an electronics module contains the direct drive motor, feedback encoder, power supply, and motor controller. The motor can be mounted to a lower bulkhead, and the drive shaft can be bolted directly to the motor. The motor can have a through hole configured to allow the passage of a WR90 flanged waveguide and provide a direct path for the waveguide to the antenna. The lower bulkhead of the module can be reinforced so as to help bear the load of the rotating antenna assembly.

The antenna can be connected to the modified Kelvin Hughes radar via a WR90 waveguide through a rotary joint that can be located within the hollow drive shaft. The shaft can be a gasket sealed around the rotary joint on the lower side.

In various embodiments, the electronic modules are about 24 in$^2$ with the height adjusted to fit the contents of the given module. The bottom tray of the antenna controller can be strengthened to carry the suspended rotating mass.

The general characteristics of the radar system for operation from a stratospheric balloon can be application specific. The radar can operate from an altitude of about 68,500 ft. This, together with power and weight constraints, may create a high-grazing angle, thus making the clutter return from the ground or sea significant. De-cluttering can be accomplished, such as by using Doppler processing. In configurations that include Doppler processing, a dwell time on the order of 100 ms. can be implemented. Such a dwell time can affect the rotation rate. The rotation rate is inversely related to the beam width. The Signal to Noise Ratio (SNR) and the range accessible to the radar with acceptable SNR can be a function of the antenna gain and radar power.

Two performance criteria are modeled using the parameters in Table 1-1:

(1) the SNR, which is the radar return from a target with a given cross section versus the system noise, and (2) the Signal-to-Clutter Ratio (SNC), which is the radar return from a target with a given radar cross section versus the radar background clutter.

TABLE 1-1

| | |
|---|---|
| Frequency: | 9.41 GHz |
| Pulse width: | 240 ns (compressed) |
| Power: | 100 kW (compressed) |
| PRF: | 1200 Hz |
| Antenna RPM | 1 |
| Noise figure: | 6 dB |
| Losses: | 4.6 dB |
| Lookdown angle: | 15° |
| Target RCS: | 10 m^2 |

There can be adequate SNR to operate the radar beyond ranges of about 100 km radius (e.g., a coverage of about 200 km diameter). Second, the SNC can allow tracking of small, moving targets using Doppler processing.

Using the selected Kelvin Hughes X-band radar, the performance model was run for antenna and other system parameters. Estimates of SNR are shown for a target of about a 10-dB cross section in a maritime environment with sea state 3. The radar used has about a 200-W amplifier and about a 500:1 pulse compression, is horizontally polarized, and has a maximum duty cycle of about 13%. This radar is outfitted with a suitable high-gain antenna, and the antenna is pointed down toward the surface, such as at an optimal angle.

Figure 9:
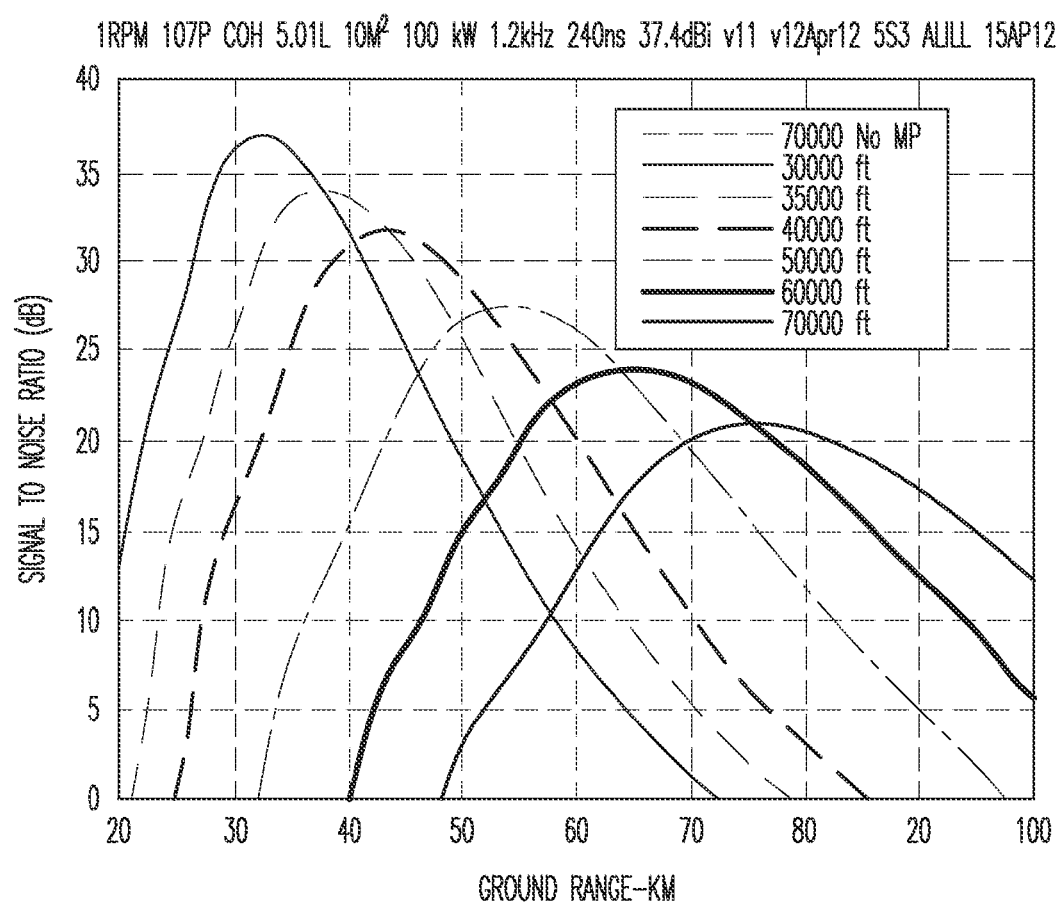
FIG. 9 illustrates computed SNR curves, according to an example.

In various embodiments, the Doppler spectrum of the return from the sea surface is expected to be similar to that shown in the example of FIG. 9. The Doppler spectrum of the clutter return can depend upon sea state and wind direction, but in general it can be expected that the return for this type of radar (with a large resolution cell) can have a roughly Gaussian spectrum with about a 3-dB width less than about 1 m/s centered at a velocity of order about 1 m/s. The clutter return from the sea, in the Doppler domain, can be contained within a few meters per second. This means that Doppler processing can enable the detection of targets with velocities outside this band and against the thermal noise of the radar. The clutter and noise return from land can be similarly limited to a band around zero velocity—the mean at about zero. The width of the clutter spectrum can comes from the internal motion of vegetation on the land. The clutter spectrum can be exponential in shape and contained within about ±1 m/s, as observed in radar tracking of individual people walking at about this velocity, edging up against the clutter spectrum. The statistical distributions of the fluctuating amplitude from both land and sea clutter have also been studied in detail and are can have long tails, so that the Doppler processing and separation in the Doppler domain may be used for success in detection with radar. A maritime radar a with high rotation rate, such that it gets only a few pulses on a given target, may not succeed when deployed to a proposed elevation. These radars are usually employed at low altitudes, with small grazing angles, because the clutter decreases for these smaller grazing angles.

In various embodiments, the grazing angle for a stratospheric radar at about 68,500 ft. ranges from about 45 degrees at about 22 km in radium to about 12 degrees at 100 km in radius, and may not reach the small grazing angle regime. The SNR for a single dwell with this radar with an antenna measuring about 10 ft. by about 15 in., with a horizontal beamwidth of about 0.75 degrees in azimuth and about 6.4 degrees in elevation, tilted down about 15 degrees, is shown in FIG. 9. The right panel shows the SNR as a line plot for several selected radar heights, as indicated in the legend at the upper right. The model shown in FIG. 9 includes the effect of multipath interference, which can enhance or degrade the performance at small grazing angles. At the large grazing angles that are obtained in this example (e.g., about 12 to 45 degrees), multipath may not play a role.

Figure 12:
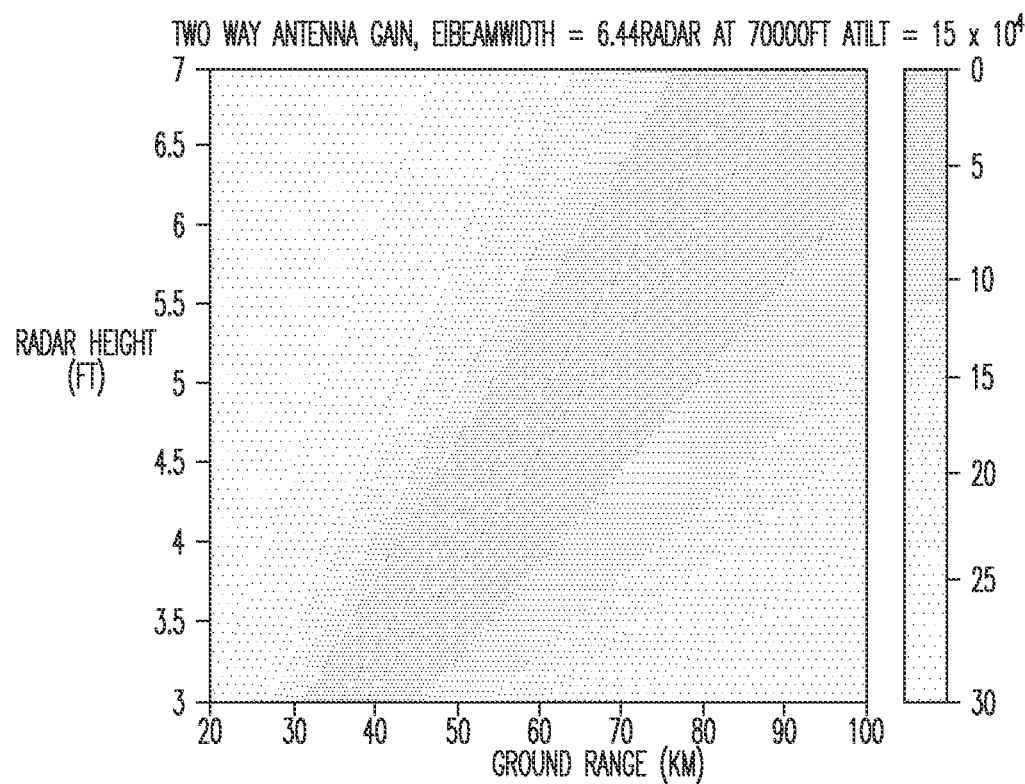
FIG. 12 illustrates antenna gain curves, according to an example.
Figure 12:
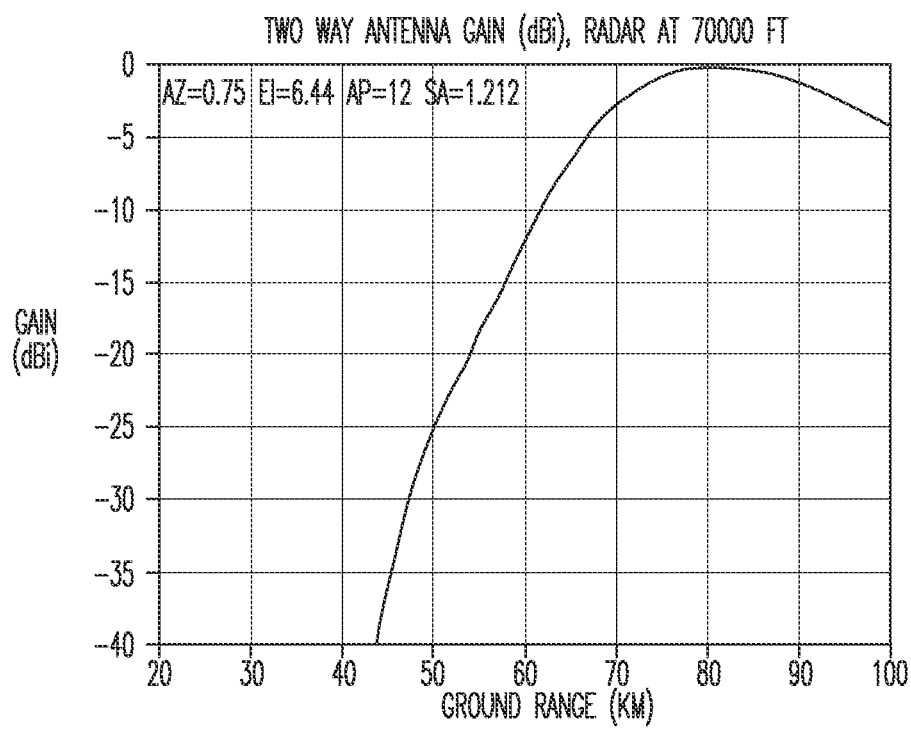

The antenna gain was computed in a similar way as the SNR shown in FIG. 9 and is shown in FIG. 12. This computation shows that a lobed nature of the SNR can be due to a narrow vertical beamwidth of the antenna. This can provide an antenna gain of about 37.4 dBi. As previously stated, the antenna can be pointed downward at about 15 degrees from horizontal. The beamwidths can be one-way 3 dB (half power point) widths of the radiation pattern. The antenna pattern was computed with a cylindrical wave front at the aperture having a departure from flat phase of about 1.2116 wavelengths and cosine amplitude weighting across an aperture of about 12 wavelengths. This produces a pattern with a smooth fall-off angle. Since the SNR is a function of the square of the gain, a high gain of an antenna can be helpful.

Figure 10:
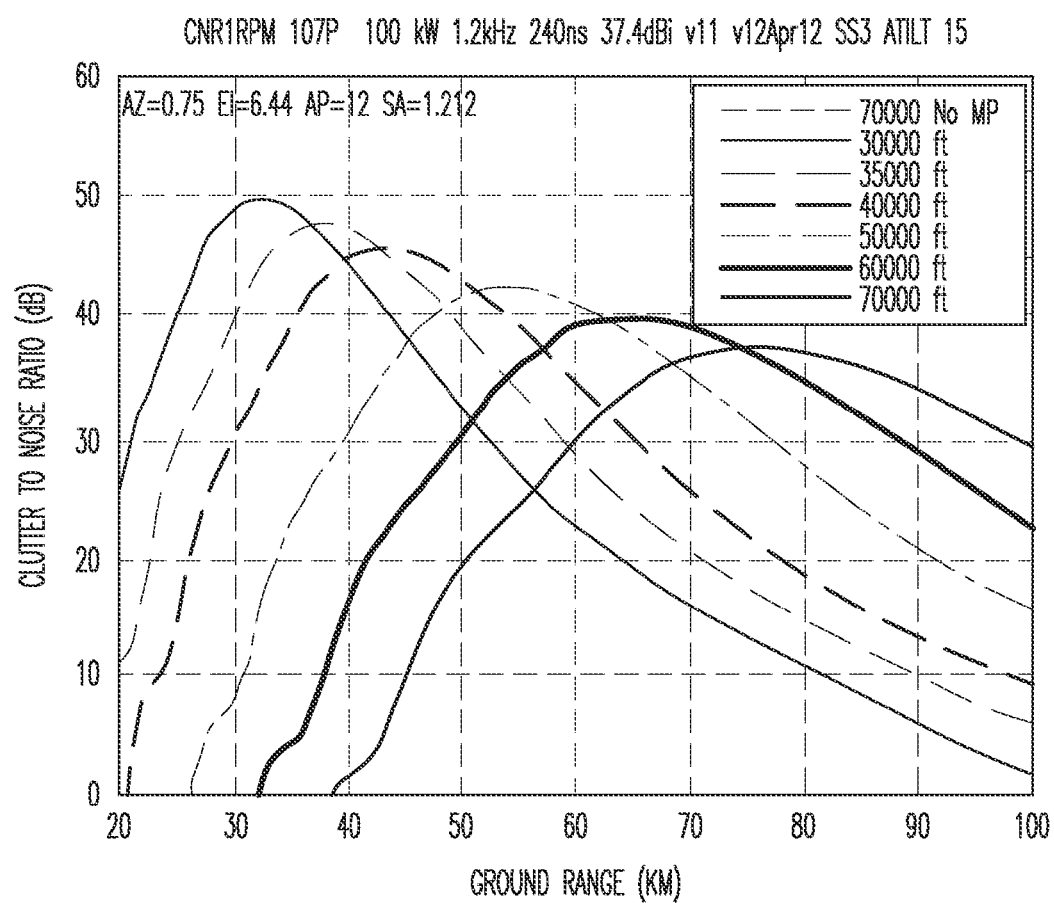
FIG. 10 illustrates clutter-to-noise curves, according to an example.
Figure 11:
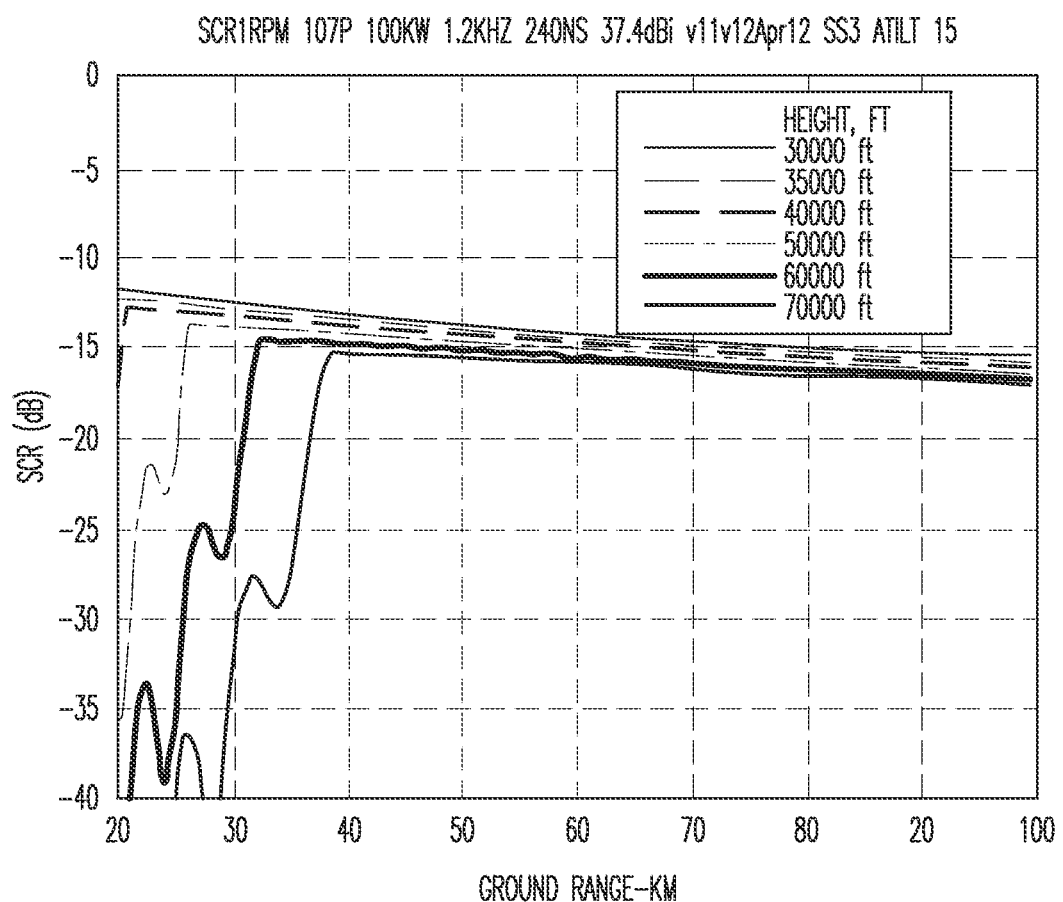
FIG. 11 illustrates signal-to-clutter curves, according to an example.

With respect to FIG. 12, the figures were obtained with the parameters in Table 1-1, which were estimated for this application. From these parameters the effective number of pulses in a dwell is about 107, and the SNR shown reflects the coherent integration of this number of pulses, thus providing a gain equal to about the number of pulses. The target was presumed not to fluctuate during the dwell. The clutter-to-noise ratio is shown in FIG. 10 and the signal to clutter ratio in FIG. 11. These figures illustrate that coherent Doppler processing to separate the target from this fluctuating clutter return can be helpful.

The following provides an Overview of Vista's Smart Sensor Radar System (SSRP) and Smart Sensor Radar Processor (SSRP) for Maritime and Land Radar Processors. In various embodiments, a comprehensive line of Smart Sensor Radar Processor (SSRP) products for maritime, land, and aircraft wide-area surveillance applications using low-cost COTS radar systems and a SSRP processor are used in the above system. The algorithm implementation in this effort can be performed using existing tracking algorithms that are incorporated in the SSRP. Real-time detection and tracking algorithms, which includes full Bayesian Track-Before-Detect processing for a 360° radar field-of-regard, can be executed in the SSRP. In an embodiment, the SSRP system, which is hosted in a rugged box, 4 U (7 in.) high by 21 in. deep and based on a military qualified system, is shown in FIG. 6. A Remote Control Unit (RCU), also shown, can allow the Radar to be operated at remote locations and is used for tower, building, aerostat, and mobile vehicle platforms. When the radar already exists and provides appropriate information to the SSRP (such as with most ships and the TARS), the RCU may not be needed. In an embodiment, the SSRP tracking system is able to develop and maintain track on many thousands of targets in the surveillance region (see FIG. 13). Both the RCU and SSRP come in indoor and outdoor mechanical packaging.

These products can be operated from a ship, a tower, a truck, a building, or an aerostat, or other locations. While there are many differences in these platforms and their impact on the performance of a radar system, two examples include elevation of the radar relative to the elevation of the target; and motion of the platform. In general, higher elevations provide better target visibility to the radar, and thus small targets, which may be hidden from terrain or man-made features on land or waves in the maritime environment, may be observed at higher elevations. Each of the platforms can move and this movement can affect the performance of the radar system. The SSRP can operate from all of these platforms without the motion impacting its performance. The SSRP can take advantage of the platforms with higher elevations to see targets that are hidden from view if the radar is positioned too low. Low elevations for radars located on mobile platforms can be about 20 to 30 ft. off the ground and high elevations for radars can be on aerostats that are at about 300 ft. to greater than about 10,000 ft. Ship masts and towers range in height from 40 ft. to 100 ft., with many towers being 60 to 100 ft. Buildings can provide a wide range of elevations. To achieve the best performance, radars should operate at low grazing angles and understand the impact of multipath, both of which are a function of radar elevation. This processing systems of the present disclosure have been successfully used at large grazing angles when deployed for aerostats at elevations ranging from 500 ft. to over 10,000 ft.

The SSRP can operate with low-cost, COTS, X-band, noncoherent maritime navigation radars, but the SSRP can also be used with both noncoherent and coherent Doppler radars over a wide range of radar frequencies (e.g., X-, Ku-, C-, S-, and L-bands). The MRP and LRP can detect targets with small radar cross-sections (RCS<1 $m^2$) for maritime (i.e., anything that is on the surface of the water from jet-skis to speedboats to large ships), on land (i.e., people, groups of people, and small vehicles), and in the air (i.e., ultra-lights and small aircraft) applications. High performance has been achieved because of the implementation of special signal processing algorithms developed to address the detection and tracking of small targets at long ranges with very low false alarm rates as discussed in the '647 Patent and '099 Application. In various embodiments, the SSRP achieves a probability of detection of >99% on targets with cross sections of 1 $m^2$ and a false alarm rate of less than 1 false target every six hours. Illustrations of this capability are presented in FIGS. 13 and 14.

In various embodiments, MRP algorithms can achieve a high level of performance against small targets, because they allow operation in high clutter conditions produced by adverse weather (rain), high winds, and high sea states where other systems fail. Thus, small targets can be reliably detected at longer ranges than normally possible without false alarms overcoming the system. MRP has demonstrated the capability to detect and track small targets moving across frozen lakes like snowmobiles and small, slow-flying aircraft. For identification and classification purposes, Advanced Imaging Solution (AIS) information can be automatically correlated and superimposed on the MRP detections and tracks. The situational awareness developed from MRP detections and tracks can provide important information and alerts about potential threat situations. The MRP and LRP have been used with X-band and S-bands maritime radars, but can be used with other types of radar system, including Doppler radars. For example, the MRP was installed on the existing L-band Doppler radar on the TARS (at elevations of about 10,000 ft.) in Lajas, Puerto Rico, for assessing improvements for tracking small maritime surface vessels at ranges up to 200 nm.

Figure 13:
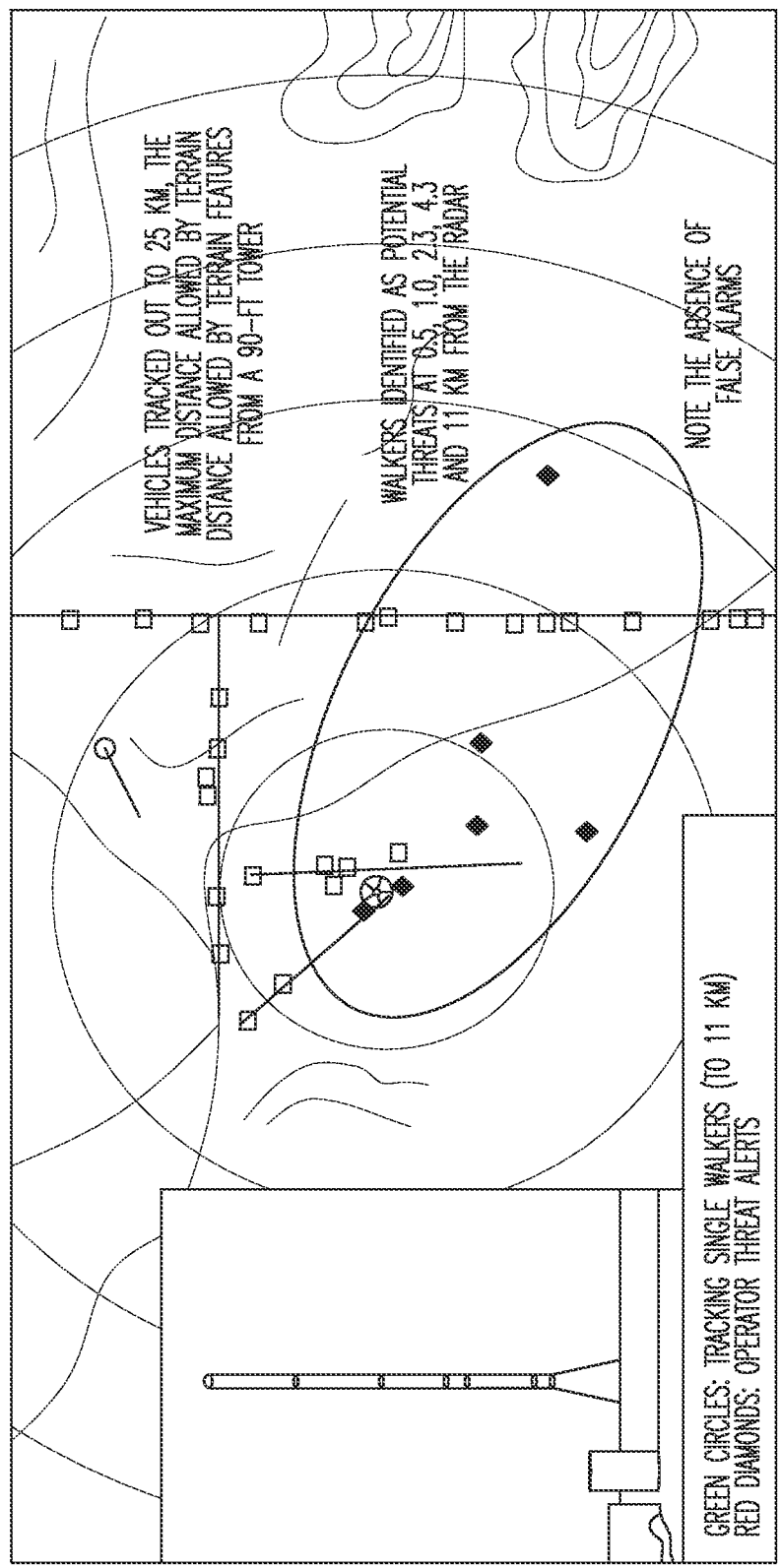
FIG. 13 illustrates radar tracks of walkers, according to an example.

In various embodiments, LRP algorithms can achieve high performance against small, slow moving targets like people and small vehicle, because they can operate in high clutter conditions produced by moving trees and vegetation during windy conditions. As part of the evaluation testing, the SSRS system was operated from a 90-ft tower and from a low-altitude aerostat. The SSRS outperformed the other radars mounted on the tower by a factor of 10, and the SSRS was the only radar system that could be operated from the aerostat. Controlled targets with GPS consisted of people walking and vehicles. FIGS. 6 and 13 illustrate the SSRP 25 kW Radar System deployed from a 90 ft. tower at the Yuma Proving Grounds (YPG). FIG. 13 shows results from this system and illustrates that the LRP can detect and track small land targets like walkers out to ranges greater than 10 km, and these detections and tracks are not masked by false alarms. The Vista SSRS mounted on the aerostat can perform about equally as well as the Vista SSRS mounted on the tower for both walkers and vehicles. Single walkers can be detected and tracked out to about 11 km in this configuration, and small groups of walkers (2 to 3) were detected and tracked out to about 18 km in this configuration. Vehicles and other objects with larger radar cross sections than people were detected and tracked out to distances of about 25 km. The SSRS on the aerostat extended the range to over 40 km, because terrain features, which can obstruct visibility from the tower did not obstruct visibility from the aerostat.

In an example, while testing at YPG, vehicles at ranges of about 28 and 34 km were tracked using a SSRS on the aerostat. During the tests at YPG, measurements were also made from an aerostat positioned at elevations ranging from about 500 ft. to about 2,000 ft. In some instances, the aerostat and tower LRP measurements were made simultaneous from the same ground location. Similar results for both people and vehicle targets were routinely observed from both platforms. The results indicated that vehicles can be detected at greater ranges from an aerostat than from a tower. This can be because of the higher elevation of the aerostat (e.g., 2,000 ft. compared to 90 ft.).

Figure 14:
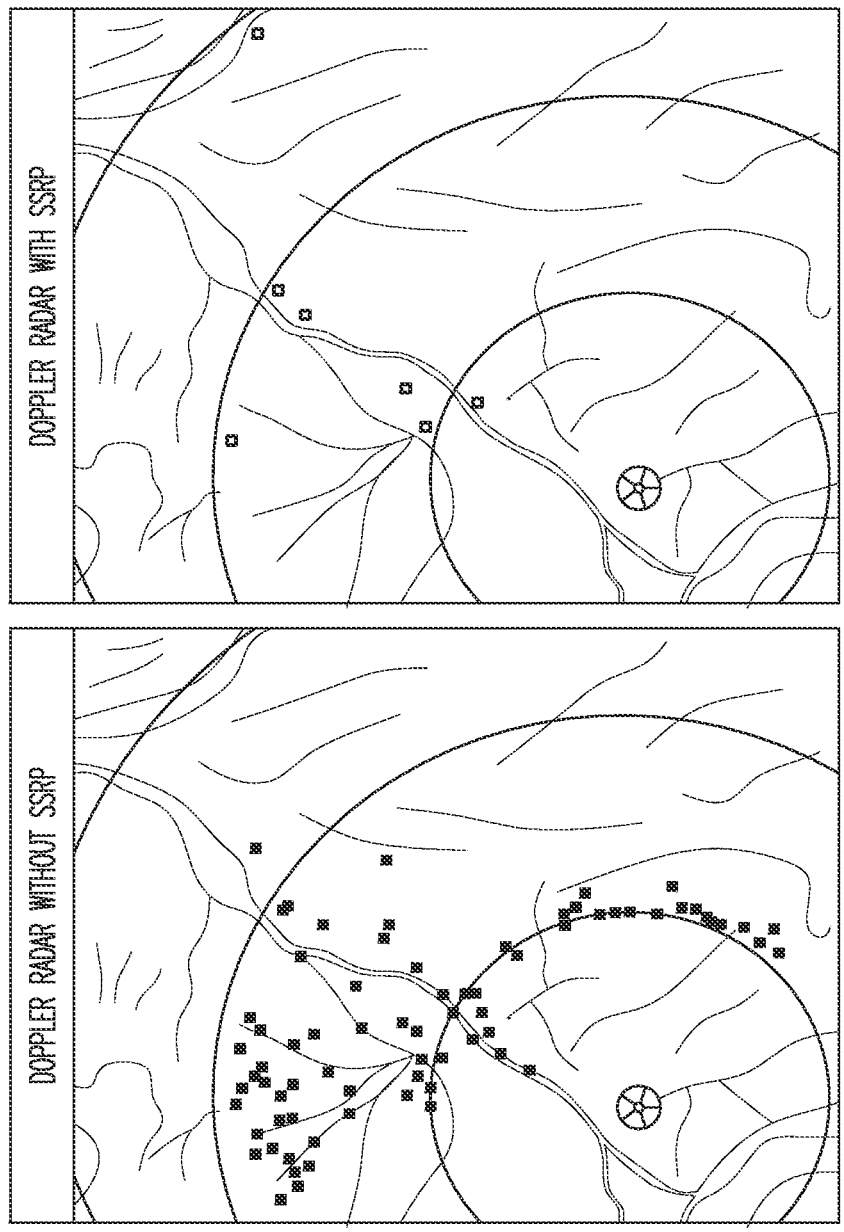
FIG. 14 illustrates a comparison of radar tracks, according to an example.

FIG. 14 illustrates an application for the SSRP where only a subset of the processor was used to reduce the false alarms of border surveillance radar systems operated from a 25 ft. mast on a stationary vehicle. In this case, only the detection outputs of the radar were processed compared to applications where the SSRP starts its processing on the raw data. FIG. 14 shows the impact of wind when it blows bushes before (left) and after (right) the application of the SSRP processor. The targets identified in green on the right panel processed with the SSRP are not discernible on the left panel processed with the radar itself. A user in such a situation can have to choose between tracking all or none of the targets on the left because there may be too many targets to track. An advantage of the SSRP can include the capability for operating at a very low false alarm rate. This is also true of the SSRP when used for maritime applications.

The SSRP (LRP) has been extensively evaluated for performance during a wide range of realistic operational conditions, including adverse weather and high clutter conditions, by Department of Human Services (DHS) on the Southern Border of the United States, in the Southern California desert areas by the Army Night Vision Laboratory (NVL), and on numerous occasions at YPG by OSD, U.S. Navy Naval Air Systems Command (NAVAIR), and the Army. After competitive evaluations, the SSRP radar system was selected and is presently being implemented on towers and aerostats for deployment to Afghanistan. Vista's SSRP radar system was the only radar system to operate successfully on both the towers and the aerostats, and was the only radar system tested that would operate from an aerostat. Tower motion impacted the performance of Vista's competitors, and there was no competition for radar measurements from the lower-elevation aerostats.

The SSRP (MRP) has successfully undergone extensive and thorough at-sea evaluations and extended operational tests under a wide range of wave, wind, temperature, and weather conditions for and funded by the US Navy, the Canadian Border Patrol (CBP)/DHS (on Lake St. Clair), and a major commercial shipping line (in the Atlantic Ocean, the Mediterranean Sea, and the Gulfs along the East African Coast (Somalia)). The MRP can detect, track, and provide situational awareness alerts for maritime and aircraft applications, including targets traveling on ice. The Navy compared the MRP to other trackers over a range of weather and wave conditions. They found that the MRP outperformed the competition by a factor of 2 to 10 in terms of detection performance, range of detections, target size, and weather conditions. In various embodiments, the MRP outperforms the competition in terms of false alarm rejection by a factor of about 10. DHS has also reviewed multiple systems and chose the MRP for the Detroit area. The MRP has been operated in winds up to 35 knots or greater during rain, other adverse weather conditions, and in sea states that exceed sea state 5. The U.S. Navy has successfully evaluated the MRP installed on a Navy combatant ship deployed to the middle east. The DHS and CBP have been successfully operating and using the MRP installed on a tower on Lake St. Clair for border surveillance since last winter and is in the process of installing a second one to complete coverage of the border in the lake.

The MRP was also evaluated on two 40-day cruises on a large ocean-going ship. The MRP was retrofitted to the X-band and S-band radars already on the ship. The results confirmed results from the U.S. Navy tests and went further—the MRP encountered and successfully operated in a wider range of adverse weather and higher sea state conditions (over Sea State 5).

The SSRP-MRP was also deployed on the USAF TARS aerostat in Puerto Rico to help expand the capabilities of TARS beyond solely tracking of large air targets, for maritime tracking of small/slower surface targets by multiple U.S. Government agencies in the Caribbean. The MRP tracks can be generated onboard the TARS aerostat for small-large maritime targets at ranges of up to 400 km from the aerostat site, and then transmitted to a server (e.g., a real-time server). In this example the real-time server was located in Arlington, Va. These tracks can be provided as near real-time tracking services over internet (TCP/IP) networks to multiple operational users along the east coast including CAMOC (San Juan), USCG (San Juan), Naval Research Lab, and USCG Miami, such as by using a reachback server.

The MRP has operated on the Lajas TARS. Sea surface and air targets can be tracked by the MRP. There is an AIS feed in this configuration, so some of the tracks can be displayed with SSRS radar data. This same feed can support graphic association of Blue Force data with SSRS tracks. This configuration can allow a user to determine (e.g., quickly determine) if a track is due to a known vessel, or an unknown. This capability supports effective observation, identification, and apprehension of unknown targets. If other track information, such as Blue Force/Identification Friend or Foe (IFF), are available, then those can be displayed in the same manner. For the TARS, if radar contacts out of the native TARS processor are available, then those contacts can be displayed.

In various embodiments, the SSRS-MRP has been deployed remotely on a coastal tower on Gull Island to monitor maritime traffic on Lake St. Clair with the radar track results being sent to the Operational Integration Center (OIC) at Selfridge. A second SSRS-MRP system is being deployed at Grosse Point. Prior to deployment, the SSRS-MRP radar was successfully demonstrated in cold (sub-freezing), rainy, and windy conditions in December 2009 from a short (25-ft) scissor-lift on Lake St. Clair. During these tests the SSRS-MRP operated in subfreezing conditions "24-7" for six days. In this time the SSRS-MRP detected and tracked controlled targets (e.g., jet skis, 18 and 25-ft boats) equipped with GPS. Additionally, low-flying aircraft/helicopters and channel markers were tracked. Winds of 15-20 knots, rain, snow, 20°-40° F. temperatures, and waves over 3 ft. on a 20-mile lake that is about 20-ft deep were encountered during this testing period. The SSRS-MRP radar system effectively detected and tracked all of the targets, and in subsequent tests, demonstrated that SSRS-MRP can effectively track snowmobiles after the lake freezes.

An extensive set of at-sea tests were conducted using control targets (e.g., jet skis, Zodiacs, 7-m and 11-m Rigid-Hulled Inflatable Boats (RHIBs), and larger craft). The analyses showed that SSRS-MRP outperforms other systems in terms of probability of detection, target size, range, false alarm rejection, and operation in adverse weather and wave conditions.

In sum, the SSRS-MRP has over 10× lower false track rate than other competitors; over 10× better detection performance than SPS radars (operated with operator assistance) currently used on U.S. Navy and U.S. Coast Guard ships; effectively operates in adverse weather conditions (rain), while other radar systems produced unacceptably large numbers of false alarms due to rain; operates in wave conditions higher than Sea State 3, while other systems are limited to much lower sea states; and can be fully automatic while other systems require operator tuning and operator expertise to run the radar and to interpret the results.

Both the ocean-going ship and the CBP/DHS Lake St. Clair tests confirmed and extended the test results obtained in the at-sea Navy evaluation, except the wind, wave, and weather conditions were larger and more adverse.

The SSRP client display can include functionality to allow an individual user to tailor usage to his/her requirements without altering other users' views. Functions are designed to help with situational awareness. In various embodiments, some features include: (1) Replay to allow a user to review tracks in the past (e.g., 9 weeks), such as at speeds faster than real time, so as to help find out where a target came from or look for patterns; (2) Bookmark to allow a user to save (e.g., quickly) a time for later replay; (3) Track Annotation to allow a user to change a threat level, such as by using Naval Tactical Display System (NTDS) and MIL-STD-2525 symbols, or name a target—note: these actions can then be seen in the displays of other users; (4) Track history and Course leaders to allow a user to quickly see where the target has been and where it is predicted to go, note that a user can adjust how many of these are visible; (5) Hook tracks to allow a user to mark a track and see its key information on a side window for quick reference; (6) Filter tracks to allow a user to Dim or remove tracks from an individual user's display based on speed, distance from the radar and other similar filters. This does not necessarily affect the tracks viewed by other users—it can display tracks differently to aid situational awareness, such as for a user only looking for a small speed range of targets; (7) Distant Measurement to allow a user to determine distances between two points on the screen; (8) Screen Markings/Drawings to allow a user to create shapes on the display to aid situational awareness by marking areas to look for targets in or other uses; (9) Map backgrounds to allow a user to switch the background (e.g., available on the system or available on a LAN) of the displayed screen; (10) Zoom and pan to allow a user to view a region as large or small or change the colors of tracks as desired; (11) Turn a track source on or off to allow MRP tracks, AIS, IFF, and other radar detections or tracks to be displayed (e.g., all at once).

Figure 15:
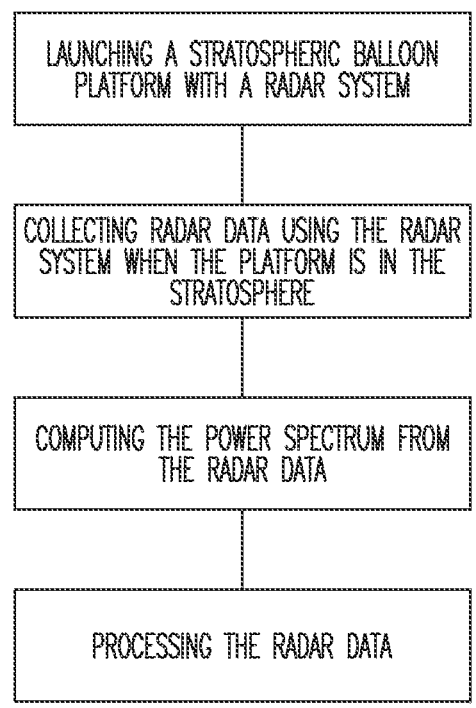
FIG. 15 illustrates a flow diagram of an example method of detecting targets using a balloon platform.

FIG. 15 a flow diagram of an example method of detecting targets using a balloon platform. In various examples, a method for detecting land, maritime, or air targets may include using a radar system mounted on a freely floating stratospheric balloon platform. The platform can move over the radar surveillance area. In an example, the platform moves using the stratospheric winds. In an example, the platform includes propulsion means (e.g., propeller fans etc.) to remain approximately stationary over a radar surveillance area.

In various examples, a radar system may be mounted in a gondolier structure (e.g., a gondola, FIGS. 2, 3A, and 3B) suspended from a balloon platform. The gondolier structure can include a battery power supply system, an antenna system, a command and control system, and a radar data collection and processing system. The antenna can be protected by a structural enclosure (e.g., roll cage) during launch and recovery of the gondolier structure. In an example, the structural enclosure can open during radar surveillance to allow the antenna to rotate for data collect. The antenna can rotate 360 degrees at a set rotation rate. The rotation rate can be set or changed by a command and control system on the gondolier structure (e.g., automatically or by receiving instructions from a ground operator). In an example, the command and control system includes navigation means (e.g., GPS sensor, transponder) for locating the position of the balloon platform. In various examples, the balloon platform can include communication means (e.g., receiver, transmitter, transceiver) to communicate with the surface (e.g., an operator or control system) to receive instructions and provide output from the radar system or other sensors on the balloon platform. The communication means may include a high frequency system.

In various examples, the radar system on the balloon platform is a non-coherent radar system. Radar data from the radar can be processed after computing the power spectrum of the radar data. In an example, the radar system is a coherent radar system.

In various examples, the balloon platform is launched from a land, maritime, or air platform. The balloon platform can move into the stratosphere, collect radar data and other surveillance data, and return to the surface of the earth. In an example, the balloon platform is expendable. In an example, radar processing software, radar data, and processed results can be destroyed (e.g., a timeout or by receiving an instruction from the ground) if the platform is not recovered or is considered expendable. In an example, the balloon platform is recoverable and reusable.

In an example, the balloon platform includes a data acquisition and processing system. In an example, the processing system is a smart sensor processing system. Sensors may include an imaging sensor such as an EO/IR camera system. In an example, data obtained from the radar system other sensor systems may be combined in a data fusion (e.g., overlaying data received from the radar and other sensors in a display).

Although various examples, has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. As it common, the terms "a" and "an" may refer to one or more unless otherwise indicated.

What is claimed is:

1. A method comprising:
launching a surveillance platform, the surveillance platform including:
a stratospheric balloon;
a gondolier structure comprising a battery power supply system, an antenna system, and a command and control system, wherein the gondolier structure is suspended from the stratospheric balloon, and wherein the antenna system is protected by a structural enclosure during launch and recovery of the gondolier structure; and
a radar system, wherein the radar system is mounted in the gondolier structure; and
opening the structural enclosure of the antenna system during radar surveillance to allow the antenna to rotate for data collection;
setting the rotation rate of the antenna to rotate 360 degrees;
detecting land, maritime, or air targets in a radar surveillance area with the radar system; and
transmitting, from the surveillance platform, data associated with the targets detected by the radar system.

2. The method of claim 1, further comprising incorporating propulsion means on the surveillance platform and using the propulsion means to have the surveillance platform remain approximately stationary over the radar surveillance area.

3. The method of claim 1, wherein setting the rotation rate includes setting the rotation rate using the command and control.

4. The method of claim 1, wherein the command and control system includes a GPS.

5. The method of claim 1, wherein transmitting from the surveillance platform includes transmitting using a high frequency system.

6. The method of claim 1, wherein the radar system is a non-coherent radar system.

7. The method of claim 6, further comprising:
computing a power spectrum from radar data collected using the radar system; and
after computing the power spectrum, processing the radar data.

8. The method of claim 1, wherein the radar system is a coherent radar system.

9. The method of claim 1, further comprising:
collecting sensor data from a camera on the surveillance platform.

10. A surveillance platform to detect and, maritime, or air targets in a radar surveillance area, the surveillance platform comprising:
- a stratospheric balloon;
- a gondolier structure, wherein the gondolier structure is suspended from the stratospheric balloon and wherein the gondolier structure includes:
  - a non-coherent radar system, wherein the radar system is mounted to the gondolier structure, and wherein the radar system is configured to compute the power spectrum of radar data collected by the radar system;
  - a battery power supply system;
  - an antenna system;
  - a structural enclosure protecting the antenna system configure to open during radar surveillance, wherein the structural enclosure is a roll cage; and
  - a command and control system.

11. The surveillance platform of claim 10, wherein the command and control system includes a GPS.

12. The surveillance platform of claim 10, further comprising propulsion means.

13. The surveillance platform of claim 12, wherein the propulsion means allows the surveillance platform to remain approximately stationary over the radar surveillance area.

14. The surveillance platform of claim 10 further comprising communication means to communicate data collected by the radar system.

15. The surveillance platform of claim 10, wherein the antenna includes an active array including slotted waveguide elements, a support frame, and a structure to support and to position the array elements.

* * * * *